United States Patent
Horikita et al.

(10) Patent No.: US 10,026,968 B2
(45) Date of Patent: Jul. 17, 2018

(54) METHOD FOR PRODUCING FUEL CELL ELECTRODE CATALYST

(75) Inventors: Masaki Horikita, Tokyo (JP); Kunchan Lee, Tokyo (JP); Yasuaki Wakizaka, Tokyo (JP); Takashi Sato, Tokyo (JP)

(73) Assignee: SHOWA DENKO K.K., Tokyo (JP)

(*) Notice: Subject to any disclaimer, the term of this patent is extended or adjusted under 35 U.S.C. 154(b) by 878 days.

(21) Appl. No.: 14/000,569

(22) PCT Filed: Jan. 4, 2012

(86) PCT No.: PCT/JP2012/050008
§ 371 (c)(1),
(2), (4) Date: Aug. 20, 2013

(87) PCT Pub. No.: WO2012/114778
PCT Pub. Date: Aug. 30, 2012

(65) Prior Publication Data
US 2013/0330659 A1    Dec. 12, 2013

(30) Foreign Application Priority Data
Feb. 21, 2011 (JP) .................. 2011-035002

(51) Int. Cl.
H01M 4/88        (2006.01)
H01M 4/90        (2006.01)
H01M 8/1018      (2016.01)

(52) U.S. Cl.
CPC ....... *H01M 4/8882* (2013.01); *H01M 4/8825* (2013.01); *H01M 4/9008* (2013.01);
(Continued)

(58) Field of Classification Search
CPC .... H01M 4/88; H01M 4/9083; H01M 4/9075; H01M 4/86; H01M 4/9008;
(Continued)

(56) References Cited

U.S. PATENT DOCUMENTS 7,125,822 B2   10/2006  Nakano et al.
7,205,255 B2    4/2007  Yamamoto
(Continued)

FOREIGN PATENT DOCUMENTS

CN       101627496 A       1/2010
EP         1701790    *   10/2004
(Continued)

OTHER PUBLICATIONS

Song-Wang Yang, et al.; "Simple and Effective Preparation of N-doped $TiO_2$ Nanocrystallites with Visible-light Activities"; Journal of Inorganic Materials; vol. 20, No. 4; Jul. 2005; pp. 785-788.
(Continued)

*Primary Examiner* — Stephen J Yanchuk
(74) *Attorney, Agent, or Firm* — Sughrue Mion, PLLC

(57) ABSTRACT

A method for producing a fuel cell electrode catalyst, including a step (I) of bringing an aqueous solution of a transition metal compound (1) into contact with ammonia and/or ammonia water to generate a precipitate (A) containing an atom of the transition metal, a step (II) of mixing at least the precipitate (A), an organic compound (B), and a liquid medium (C) to obtain a catalyst precursor liquid, and a step (IV) of subjecting the solid in the catalyst precursor liquid to heat treatment at a temperature of 500 to 1200° C. to obtain an electrode catalyst; a portion or the entirety of the transition metal compound (1) being a compound containing a transition metal element of group 4 or group 5 of the periodic table; and the organic compound (B) being at least one selected from sugars and the like.

10 Claims, 8 Drawing Sheets

(52) U.S. Cl.
CPC ....... *H01M 4/9016* (2013.01); *H01M 4/9083* (2013.01); *H01M 2008/1095* (2013.01)

(58) Field of Classification Search
CPC ............. H01M 4/9016; H01M 4/8825; H01M 4/8882; H01M 8/1002; B01J 31/0202; B01J 31/0232; B01J 31/2217; B01J 31/2234; B01J 31/1815; B01J 31/2239; B01J 2531/845; B01J 2531/2239; B01J 2531/16; B01J 2531/26; B01J 2531/46; B01J 2531/48; B01J 2531/57; B01J 2531/842; B01J 2531/20; B01J 2531/72; B01J 2531/821
See application file for complete search history.

(56) References Cited

U.S. PATENT DOCUMENTS

| | | | |
|---|---|---|---|
| 7,585,585 B2 | 9/2009 | Ozaki et al. | |
| 2004/0096728 A1 | 5/2004 | Campbell | |
| 2006/0263675 A1* | 11/2006 | Adzic | B01J 23/42 429/424 |
| 2007/0072765 A1* | 3/2007 | Soled | B01J 37/0205 502/162 |
| 2008/0026282 A1* | 1/2008 | Tamura | H01M 4/8647 429/483 |
| 2010/0086823 A1 | 4/2010 | Koshino et al. | |
| 2010/0129698 A1 | 5/2010 | Okada et al. | |
| 2010/0227253 A1 | 9/2010 | Monden et al. | |
| 2010/0279853 A1 | 11/2010 | Maesen et al. | |
| 2011/0008709 A1 | 1/2011 | Shishikura et al. | |
| 2011/0015058 A1 | 1/2011 | Maki | |
| 2011/0152072 A1 | 6/2011 | Miura | |
| 2012/0028792 A1 | 2/2012 | Hattori et al. | |
| 2012/0148483 A1* | 6/2012 | Chen | H01M 4/9008 423/584 |
| 2012/0315568 A1 | 12/2012 | Lee et al. | |
| 2013/0142713 A1 | 6/2013 | Ifrah et al. | |
| 2013/0330658 A1* | 12/2013 | Palmqvist | B01J 31/1625 429/532 |

FOREIGN PATENT DOCUMENTS

| | | |
|---|---|---|
| JP | 2004-79244 A | 3/2004 |
| JP | 2004-303664 A | 10/2004 |
| JP | 2005-19332 A | 1/2005 |
| JP | 2005-135900 A | 5/2005 |
| JP | 2008-258150 A | 10/2008 |
| JP | 2009-023887 A | 2/2009 |
| JP | 2009-255053 A | 11/2009 |
| WO | 2007/072665 A1 | 6/2007 |
| WO | 2008146823 A2 | 12/2008 |
| WO | 2009/031383 A1 | 3/2009 |
| WO | 2009/107518 A1 | 9/2009 |
| WO | 2009/116369 A1 | 9/2009 |
| WO | 2010/110469 A1 | 9/2010 |
| WO | 2011/099493 A1 | 8/2011 |
| WO | 2011138255 A2 | 11/2011 |

OTHER PUBLICATIONS

Fengxiang Yin, et al.; "Improved catalytic performance of nitrided Co—Ti and Fe—Ti catalysts for oxygen reduction as non-noble metal cathodes in acidic media"; Electrochemistry Communications; vol. 12, Issue 9; Sep. 2010; pp. 1177-1179.

Extended European Search Report dated May 25, 2016, issued by the European Patent Office in corresponding European Application No. 12748862.5.

* cited by examiner (Catalyst (1))

(Catalyst (1))

(Catalyst (2))

(Catalyst (2))

(Catalyst (3))

(Catalyst (3))

(Catalyst (4))

(Catalyst (4))

(Catalyst (5))

(Catalyst (5))

(Catalyst (c1))

(Catalyst (c1))

(Catalyst (c2))

(Catalyst (c2))

(Catalyst (c3))

(Catalyst (c4))

US 10,026,968 B2

METHOD FOR PRODUCING FUEL CELL ELECTRODE CATALYST

CROSS REFERENCE TO RELATED APPLICATIONS

This application is a National Stage of International Application No. PCT/JP2012/050008 filed Jan. 4, 2012, claiming priority based on Japanese Patent Application No. 2011-035002 filed Feb. 21, 2011, the contents of all of which are incorporated herein by reference in their entirety.

TECHNICAL FIELD

The present invention relates to a method for producing a fuel cell electrode catalyst and a method for producing a fuel cell electrode or the like and more particularly relates to a method for producing a fuel cell catalyst useful as a catalyst substituted for noble metals such as platinum and a fuel cell electrode or the like.

BACKGROUND ART

A polymer electrolyte fuel cell is a fuel cell in the form in which a polymer solid electrolyte is sandwiched between an anode and a cathode, a fuel is supplied to the anode, and oxygen or air is supplied to the cathode, whereby oxygen is reduced at the cathode to produce electricity. As the fuel, hydrogen, methanol, or the like is mainly used.

To enhance a reaction rate in a fuel cell and to enhance the energy conversion efficiency of the fuel cell, a layer containing a catalyst (hereinafter also referred to as a "fuel cell catalyst layer") has been conventionally disposed on the surface of a cathode (air electrode) or the surface of an anode (fuel electrode) of the fuel cell.

As such a catalyst, noble metals have been generally used, and, among the noble metals, a noble metal stable at a high potential and having a high activity, such as platinum or palladium, has been mainly used. However, since these noble metals are expensive and limited in resource amount, development of substitutable catalysts has been desired.

Further, there has been a problem that the noble metals used on the surface of a cathode may be dissolved under an acidic atmosphere and are not suitable for uses requiring long-term durability. Accordingly, it has been strongly demanded that catalysts are developed which are not corroded under an acidic atmosphere and have excellent durability and high oxygen reducing ability.

As a catalyst substituted for noble metals, those entirely free of noble metals, such as base metal carbides, base metal oxides, base metal carbonitroxides, chalcogen compounds, and carbon catalysts, have been reported (for example, see Patent Literature 1 to Patent Literature 4). These materials are inexpensive and abundant in resource amounts as compared with noble metal materials such as platinum.

However, these catalysts containing base metal materials described in Patent Literature 1 and Patent Literature 2 have a problem that practically sufficient oxygen reducing ability is not obtained.

Further, the catalysts described in Patent Literature 3 and Patent Literature 4, although exhibiting high oxygen reduction catalytic activity, have a problem that stability under fuel cell operating conditions is not sufficient.

As a catalyst substituted for noble metals, Nb and Ti carbonitroxides in Patent Literature 5 and Patent Literature 6 can effectively express the above-described performance and thus have received particular attention.

Although the catalysts described in Patent Literature 5 and Patent Literature 6 have extremely high performance as compared with conventional catalysts substituted for noble metals, a portion of the production step thereof needs to include heat treatment under a high temperature of 1600° C. to 1800° C. (for example, Example 1 of Patent Literature 5 or Example 1 of Patent Literature 6).

Such high-temperature heat treatment is not industrially impossible but involves difficulty and causes increase in equipment cost and difficulty in operation control, leading to increase in production cost, and, thus, the development of a method capable of inexpensive production has been desired.

Patent Literature 7 reports a technology relating to the production of a carbon-containing titanium oxynitride that contains carbon, nitrogen, and oxygen.

However, according to the production method described in Patent Literature 7, the production of the carbon-containing titanium oxynitride requires two-stage synthesis: the production of a titanium oxynitride by reacting a nitrogen-containing organic compound with a titanium precursor; and the production of a carbon-containing titanium oxynitride by reacting a phenol resin with the titanium oxynitride precursor, and thus involves complicated steps. In particular, the production of the titanium oxynitride precursor requires complicated steps including stirring, heating, and refluxing at 80° C. as well as cooling and concentrating under reduced pressure, thus resulting in high production cost.

Further, since the phenol resin is a thermosetting resin having a three-dimensional network structure, it is difficult to homogenously mix and react the phenol resin with a metal oxide. In particular, there is a problem that since the thermal decomposition temperature of the phenol resin is 400° C. to 900° C., a carbonization reaction due to the complete decomposition of the phenol resin is unlikely to take place at a temperature of 1000° C. or less.

Furthermore, Patent Literature 7 and Non-Patent Literature 1 only describe applications to a thin film for a solar collector and a photocatalyst as uses thereof, failing to disclose or examine a method for producing a metal carbonitroxide having particulate or fibrous shape or the like that is highly useful as an electrode catalyst and uses thereof.

Patent Literature 8 discloses a method for producing an electrode catalyst characterized by burning a mixed material of an oxide and a carbon material precursor but an electrode catalyst having sufficient catalytic performance has not been obtained.

Further, Patent Literature 9 discloses a fuel cell electrode catalyst prepared by using a polynuclear complex of cobalt and the like but this catalyst has had problems that a cost is high and its catalytic activity is insufficient.

Non-Patent Literature 2 discloses a method for producing an electrode catalyst characterized by burning a mixed material of a titanium alkoxide and a carbon material precursor but the production step does not use an organic substance containing nitrogen and thus an electrode catalyst having sufficient catalytic performance has not been obtained.

Patent Literature 10 discloses a method for producing an electrode catalyst, comprising burning a metal compound, such as zirconium hydroxide, and a carbon material precursor, under a condition where the carbon material precursor can transit to a carbon material (e.g., 400 to 1100° C.) but an electrode catalyst having sufficient catalyst performance has not been obtained.

In addition, Patent Literature 11 discloses a method for producing a fuel cell electrode catalyst, comprising: a step 1 of mixing at least a compound containing a transition metal (element of group 4 or group 5 of the periodic table), a nitrogen-containing organic compound, and a solvent to obtain a catalyst precursor solution; a step 2 of removing the solvent from the catalyst precursor solution; and a step 3 of heat-treating a solid residue, obtained in the step 2, at comparatively low temperature, to obtain an electrode catalyst, but does not disclose a method for producing a fuel cell electrode catalyst, comprising a step of bringing an aqueous solution of a transition metal compound (1) into contact with ammonia and/or ammonia water to generate a precipitate containing an atom of the transition metal, as described below.

CITATION LIST

Patent Literatures

Patent Literature 1: JP 2004-303664 A
Patent Literature 2: WO 07/072,665
Patent Literature 3: US 2004/0096728 A1
Patent Literature 4: JP 2005-19332 A
Patent Literature 5: WO 2009/031383
Patent Literature 6: WO 2009/107518
Patent Literature 7: JP 2009-23887 A
Patent Literature 8: JP 2009-255053 A
Patent Literature 9: JP 2008-258150 A
Patent Literature 10: WO 2009/116369
Patent Literature 11: WO 2011/99493

Non-Patent Literatures

Non-Patent Literature 1: Journal of Inorganic Materials (Chinese) 20, 4, P785
Non-Patent Literature 2: Electrochemistry Communications Volume 12, Issue 9, September 2010, Pages 1177-1179

SUMMARY OF INVENTION

Technical Field

An object of the present invention is to provide a method for producing a fuel cell electrode catalyst having high catalytic activity using a transition metal (such as titanium) through heat treatment at comparatively low temperature.

Solution to Problem

The present invention relates to, for example, the following [1] to [10].

[1]
A method for producing a fuel cell electrode catalyst, comprising:
a step (I) of bringing an aqueous solution of a transition metal compound (1) into contact with ammonia and/or ammonia water to generate a precipitate (A) containing an atom of the transition metal,
a step (II) of mixing at least the precipitate (A), an organic compound (B), and a liquid medium (C) to obtain a catalyst precursor, and
a step (IV) of subjecting the catalyst precursor to heat treatment at a temperature of 500 to 1200° C. to obtain an electrode catalyst;
a portion or the entirety of the transition metal compound (1) being a compound containing, as a transition metal element, at least one transition metal element selected from elements of group 4 and group 5 of the periodic table (hereinafter also referred to as "transition metal element M1" or "M1"); and
the organic compound (B) being at least one selected from sugars, amino sugars, glycosaminoglycans, polyvinyl alcohols, polyalkylene glycols, polyesters, nitrogen-containing polymer compounds, nitrile group-containing compounds, amino acids, and organic acids.

[2]
The method for producing a fuel cell electrode catalyst according to the above [1], further comprising a step (III) of removing the liquid medium (C) from the catalyst precursor before the step (IV).

[3]
The method for producing a fuel cell electrode catalyst according to the above [1] or [2], wherein the transition metal element M1 is at least one selected from titanium, zirconium, niobium, and tantalum.

[4]
The method for producing a fuel cell electrode catalyst according to any one of the above [1] to [3], wherein the transition metal compound (1) is at least one selected from the group consisting of metal halides, metal sulfates, metal alkoxides, metal acetates, metal phosphates, metal nitrates, metal organic acid salts, metal acid halides, metal perhalates, metal hypohalites, and metal complexes.

The method for producing a fuel cell electrode catalyst according to any one of the above [1] to [4], further comprising mixing a compound containing, as a transition metal element, at least one transition metal element M2 selected from iron, nickel, chromium, cobalt, and manganese, in the step (II).

[6]
A method for producing a fuel cell electrode catalyst layer, comprising a step of producing a fuel cell electrode catalyst by the method according to any one of the above [1] to [5], and a step of forming a fuel cell electrode catalyst layer using a catalyst layer formation material comprising the fuel cell electrode catalyst.

[7]
A method for producing a fuel cell electrode comprising a fuel cell electrode catalyst layer and a porous support layer, the method comprising a step of producing a fuel cell electrode catalyst layer by the method according to the above [6], and a step of forming the fuel cell electrode catalyst layer on a surface of the porous support layer.

[8]
A method for producing a membrane electrode assembly comprising a cathode, an anode, and an electrolyte membrane placed between the cathode and the anode, the method comprising a step of producing a fuel cell electrode by the method according to the above [7], and a step of placing the cathode, the electrolyte membrane, and the anode to produce a membrane electrode assembly while using the fuel cell electrode as at least one of the cathode and the anode.

[9]
A method for producing a fuel cell, comprising a step of producing a membrane electrode assembly by the method according to the above [8], and a step of producing a fuel cell using the membrane electrode assembly.

[10]
The method for producing a fuel cell according to the above [9], wherein the fuel cell is a polymer electrolyte fuel cell.

Advantageous Effect of Invention

According to the production method of the present invention, there can be produced a fuel cell electrode catalyst having high catalytic activity using a transition metal (such as titanium) through heat treatment at comparatively low temperature.

DESCRIPTION OF EMBODIMENTS

Figure 1:
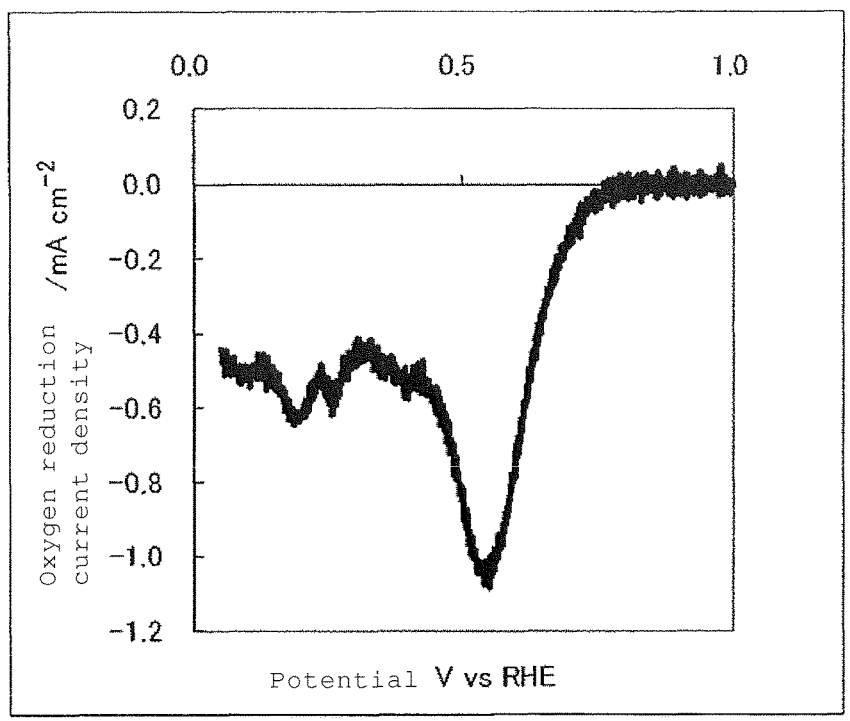
FIG. 1 is an oxygen reduction current density-potential curve of a fuel cell electrode (1) of Example 1.
Figure 2:
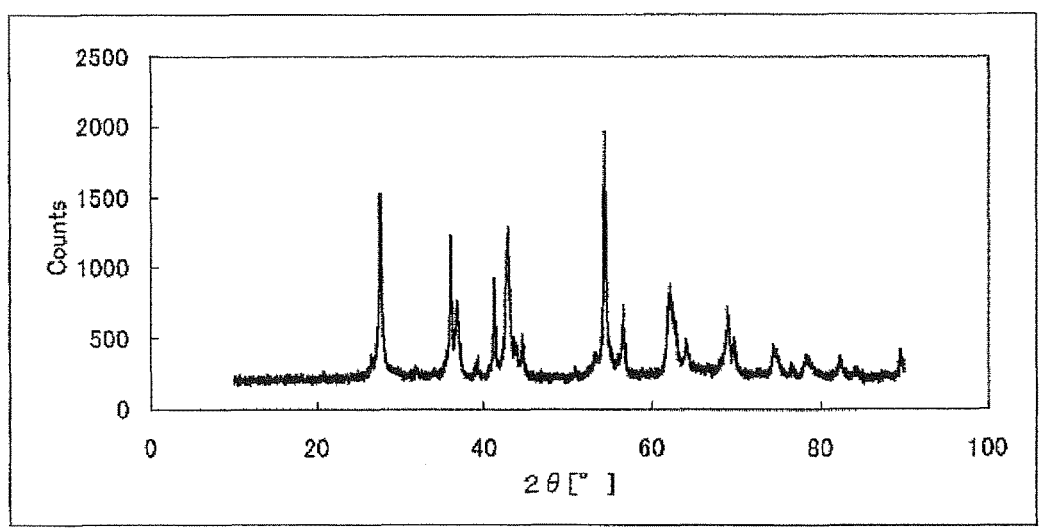
FIG. 2 is a powder X-ray diffraction spectrum of a catalyst (1) of Example 1.
Figure 3:
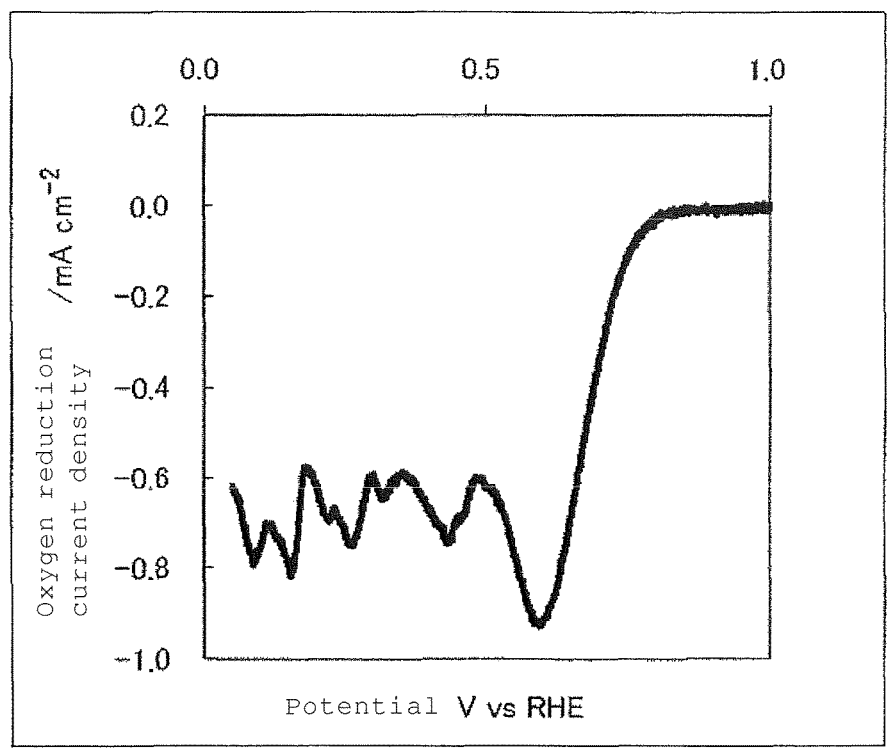
FIG. 3 is an oxygen reduction current density-potential curve of a fuel cell electrode (2) of Example 2.
Figure 4:
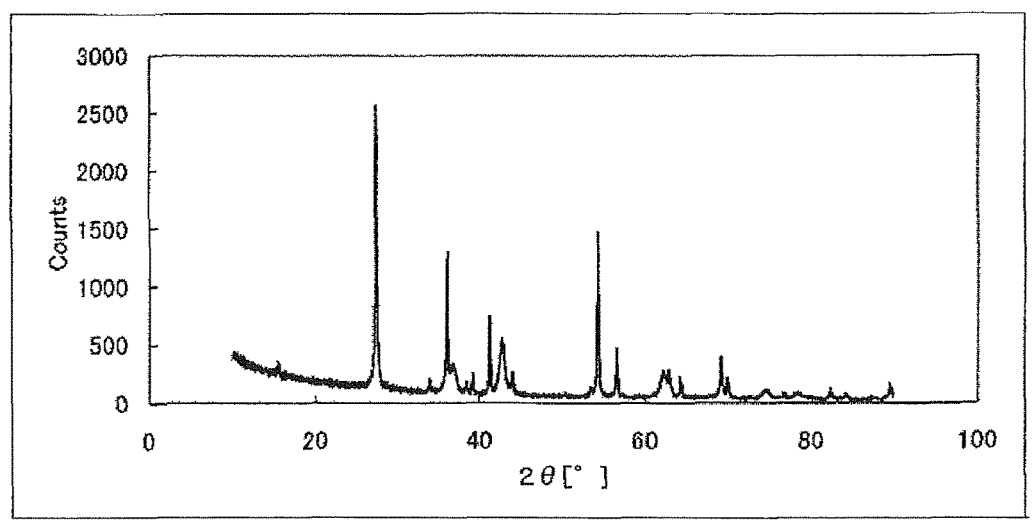
FIG. 4 is a powder X-ray diffraction spectrum of a catalyst (2) of Example 2.
Figure 5:
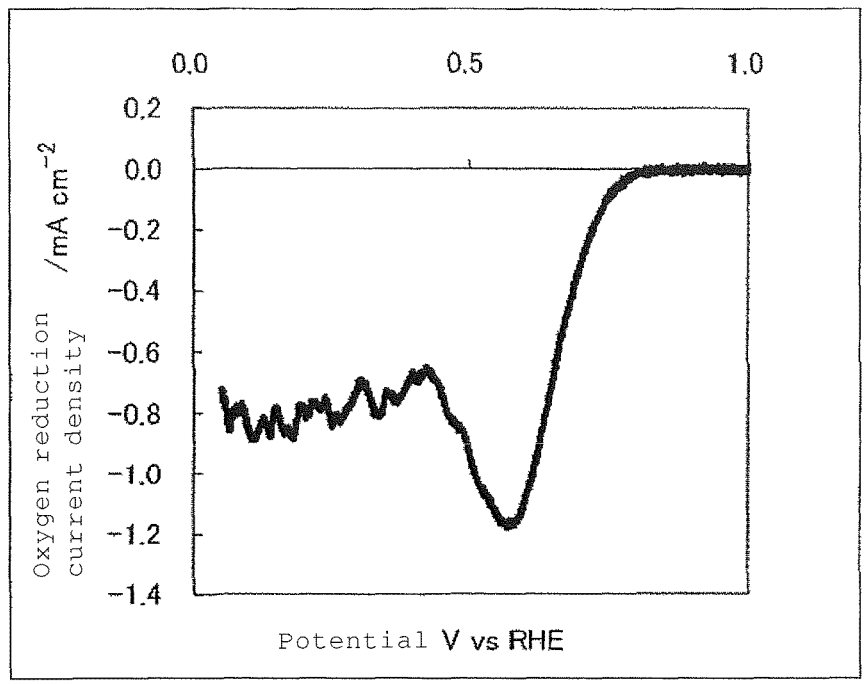
FIG. 5 is an oxygen reduction current density-potential curve of a fuel cell electrode (3) of Example 3.
Figure 6:
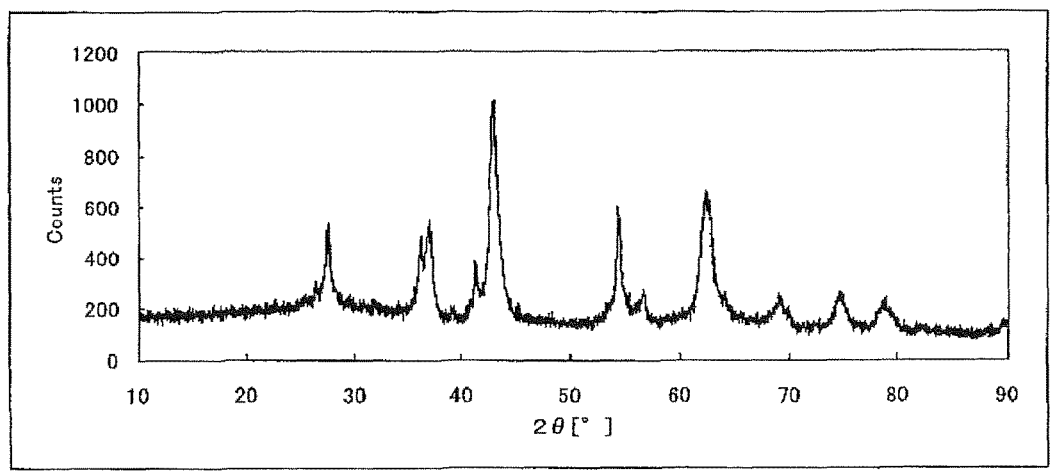
FIG. 6 is a powder X-ray diffraction spectrum of a catalyst (3) of Example 3.
Figure 7:
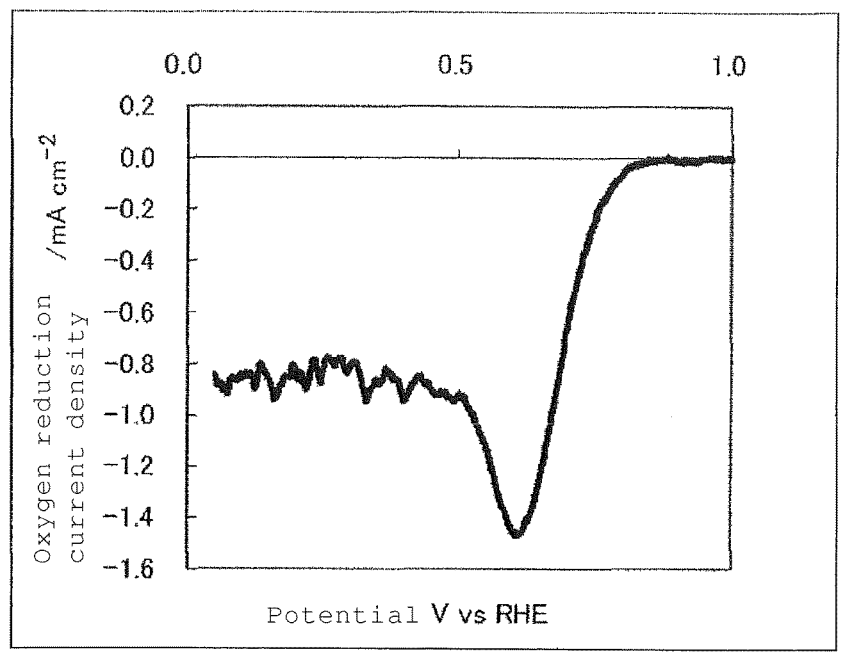
FIG. 7 is an oxygen reduction current density-potential curve of a fuel cell electrode (4) of Example 4.
Figure 8:
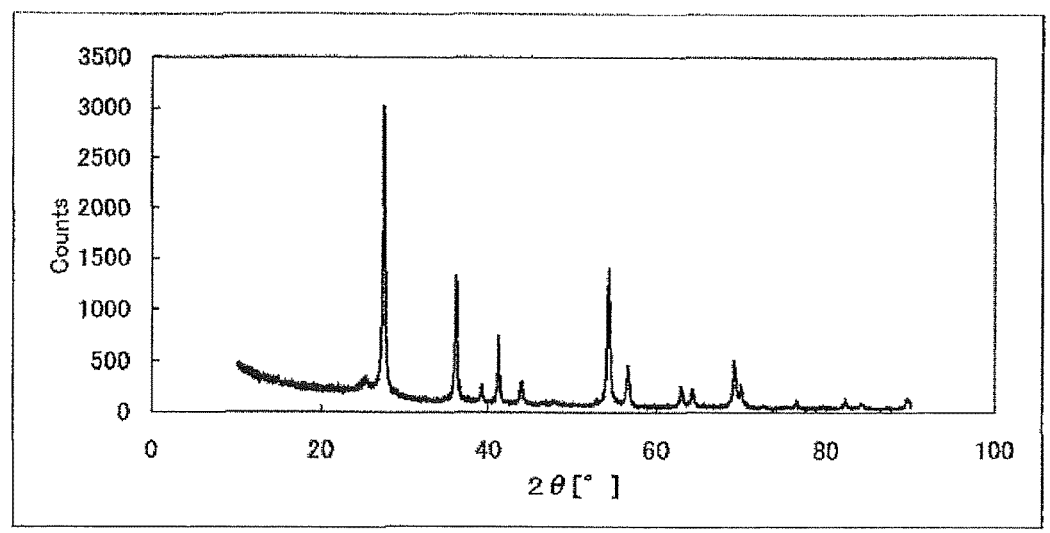
FIG. 8 is a powder X-ray diffraction spectrum of a catalyst (4) of Example 4.
Figure 9:
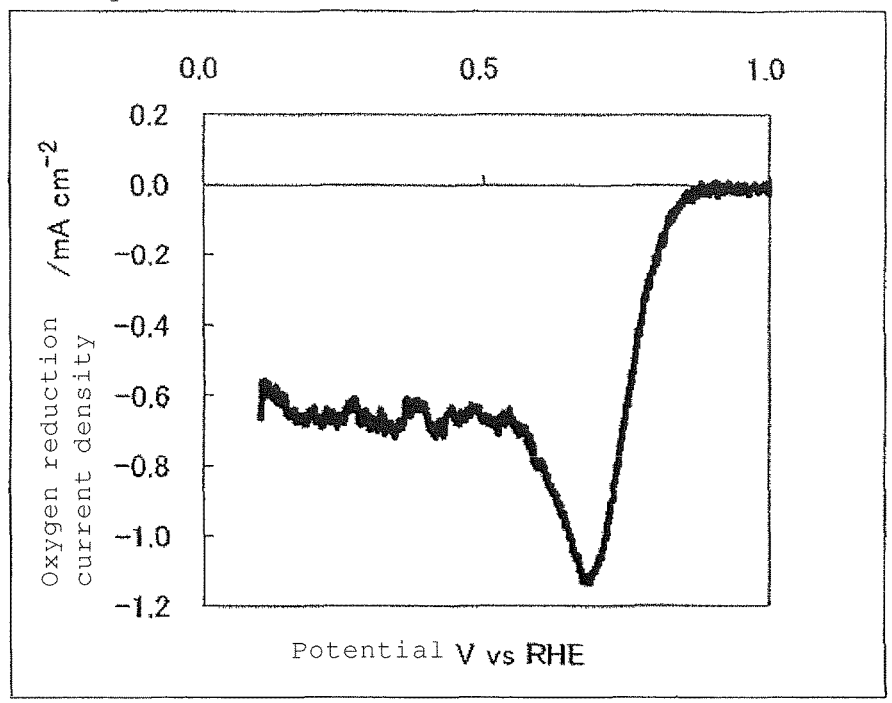
FIG. 9 is an oxygen reduction current density-potential curve of a fuel cell electrode (5) of Example 5.
Figure 10:
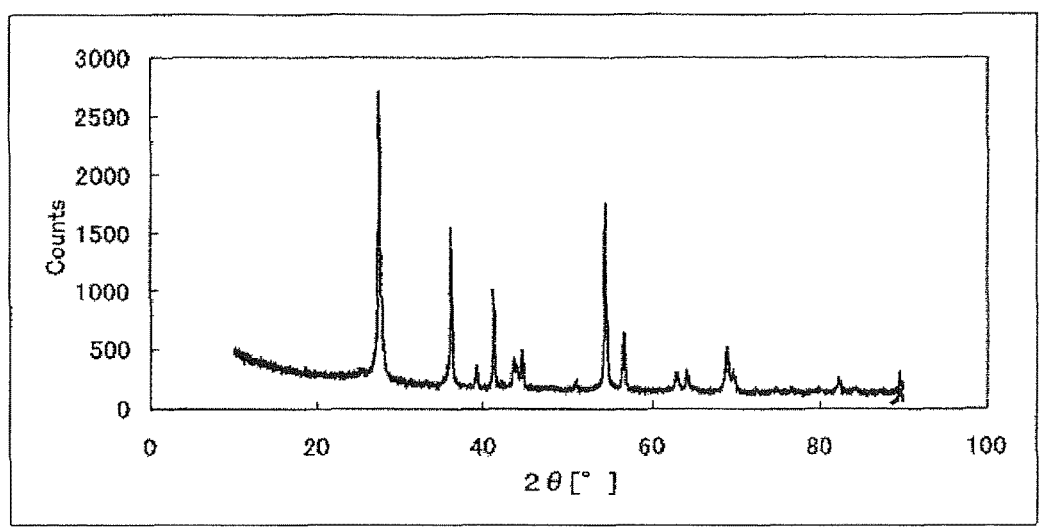
FIG. 10 is a powder X-ray diffraction spectrum of a catalyst (5) of Example 5.
Figure 11:
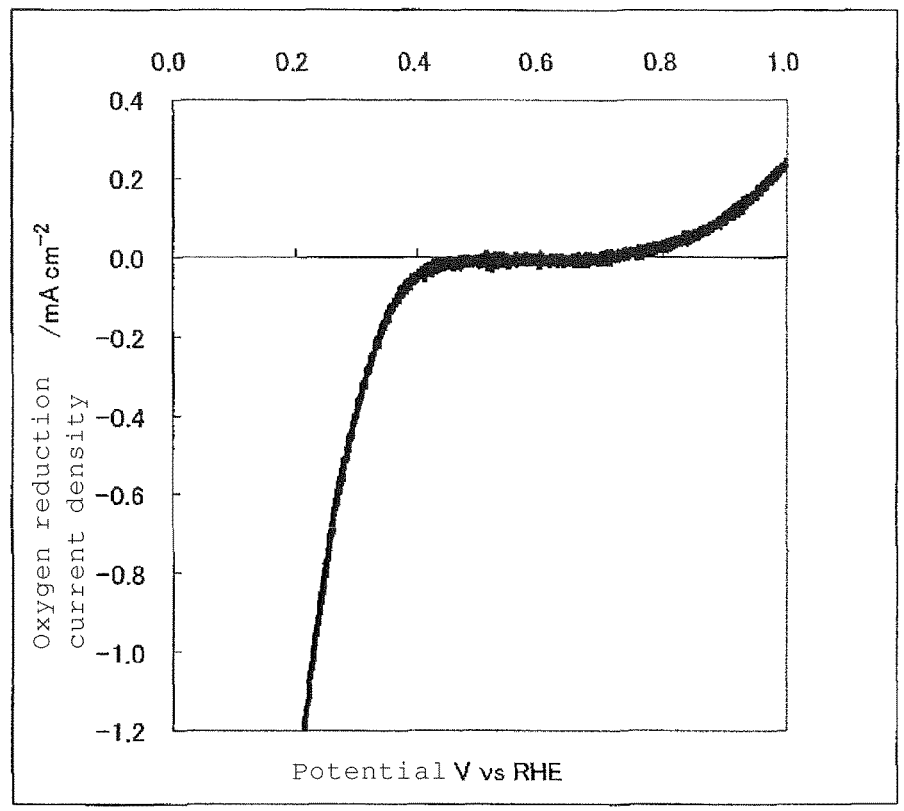
FIG. 11 is an oxygen reduction current density-potential curve of a fuel cell electrode (c1) of Comparative Example 1.
Figure 12:
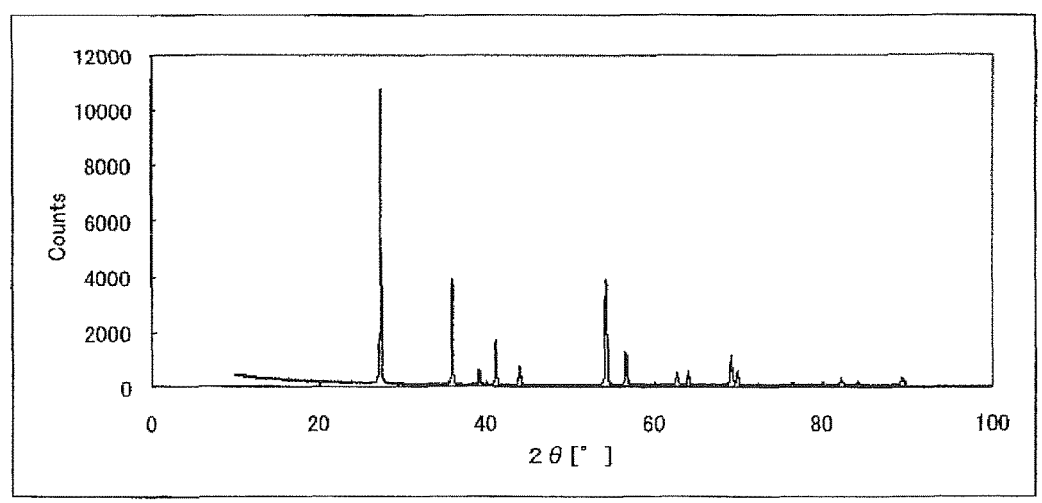
FIG. 12 is a powder X-ray diffraction spectrum of a catalyst (c1) of Comparative Example 1.
Figure 13:
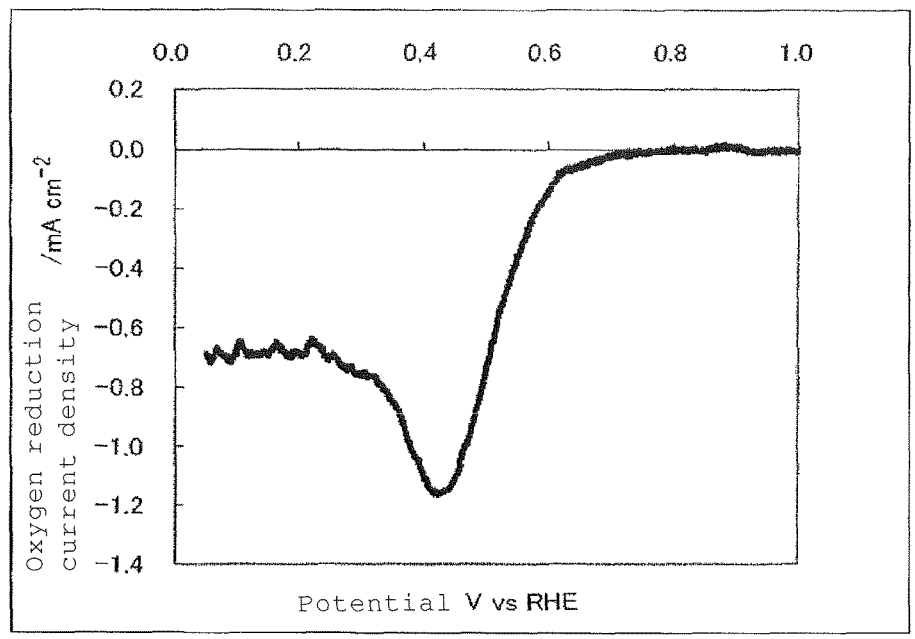
FIG. 13 is an oxygen reduction current density-potential curve of a fuel cell electrode (c2) of Comparative Example 2.
Figure 14:
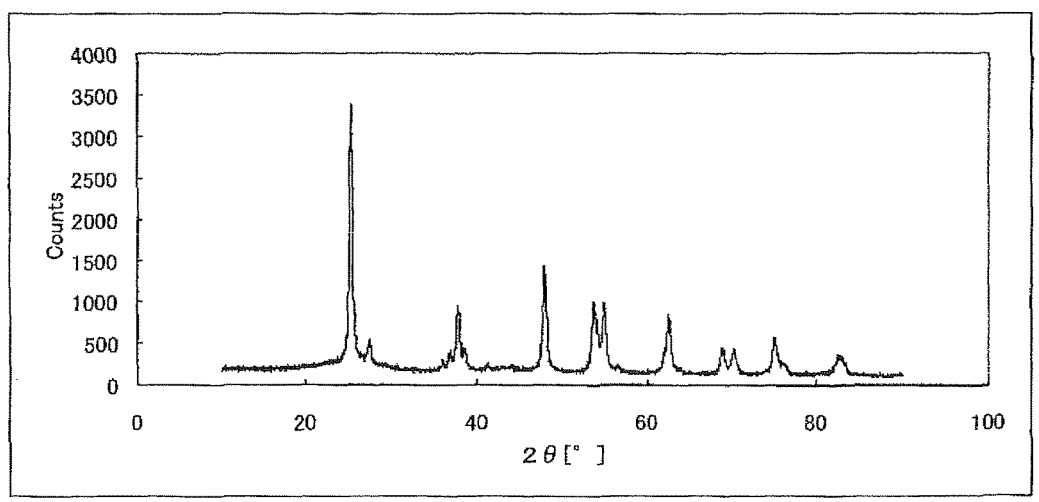
FIG. 14 is a powder X-ray diffraction spectrum of a catalyst (c2) of Comparative Example 2.
Figure 15:
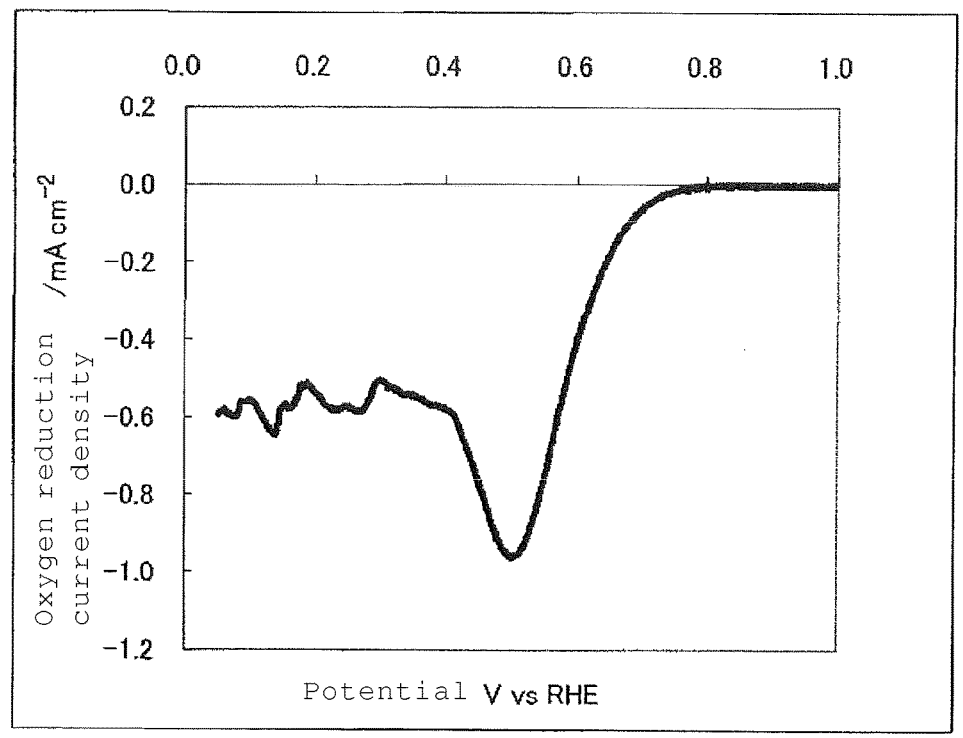
FIG. 15 is an oxygen reduction current density-potential curve of a fuel cell electrode (c3) of Comparative Example 3.
Figure 16:
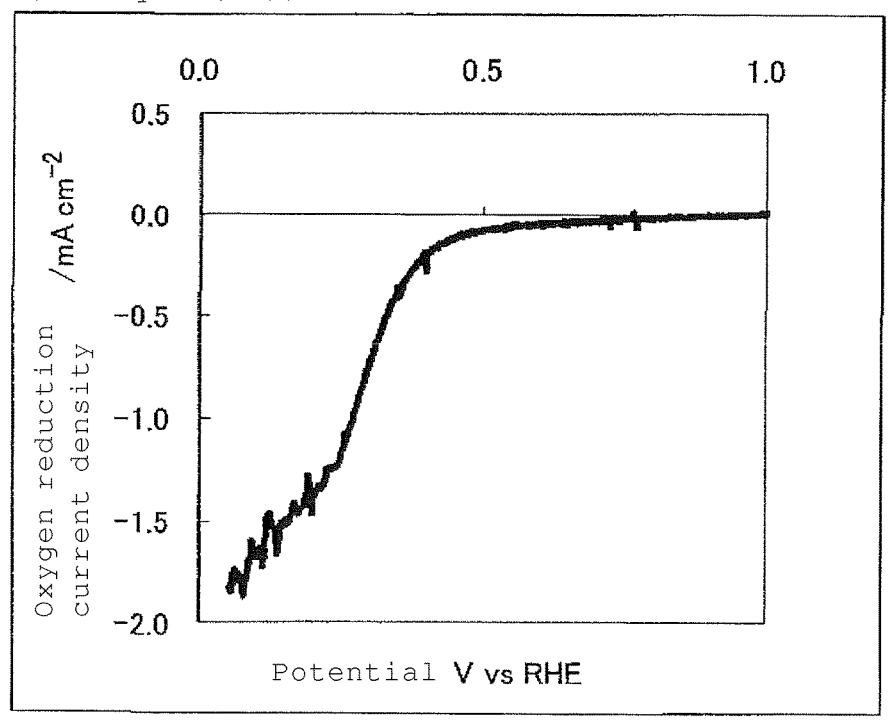
FIG. 16 is an oxygen reduction current density-potential curve of a fuel cell electrode (c4) of Comparative Example 4.

[Method for Producing Fuel Cell Electrode Catalyst]

The method for producing a fuel cell electrode catalyst of the present invention comprises:

a step (I) of bringing an aqueous solution of a transition metal compound (1) into contact with ammonia and/or ammonia water to generate a precipitate (A) containing an atom of the transition metal, a step (II) of mixing at least the precipitate (A), an organic compound (B), and a liquid medium (C) to obtain a catalyst precursor, and a step (IV) of subjecting the solid in the catalyst precursor to heat treatment at a temperature of 500 to 1200° C. to obtain an electrode catalyst;

a portion or the entirety of the transition metal compound (1) being a compound containing, as a transition metal element, at least one transition metal element selected from elements of group 4 and group 5 of the periodic table (hereinafter also referred to as "transition metal element M1" or "M1"); and the organic compound (B) being at least one selected from sugars, amino sugars, glycosaminoglycans, polyvinyl alcohols, polyalkylene glycols, polyesters, nitrogen-containing polymer compounds, nitrile group-containing compounds, amino acids, and organic acids. In the present specification, an atom and an ion are not strictly distinguished from each other unless special circumstance requires otherwise, and are referred to as an "atom".

(Step (I))

In the step (I), an aqueous solution of a transition metal compound (1) is brought into contact with ammonia and/or ammonia water to generate a precipitate (A) containing an atom of the transition metal. The precipitate (A) contains a hydroxide of the transition metal.

The contact operation is preferably carried out by adding the aqueous solution of the transition metal compound (1) to the ammonia water. This allows a catalyst that has higher dispersibility and is excellent in coating property to be obtained. This may be carried out by blowing ammonia into or adding ammonia water to the aqueous solution of the transition metal compound (1).

It is also preferable that the aqueous solution of the transition metal compound (1) is dropwise added little by little to the ammonia water (i.e., the whole amount is not added at a time).

The precipitate (A) is collected and is provided to the step (II) described below. The collection of the precipitate (A) may be carried out by centrifuging or filtrating an aqueous solution containing the precipitate (A) and is preferably carried out by centrifugation.

The collection of the precipitate (A) by the centrifugation is carried out by a series of operations of the centrifugation of the aqueous solution containing the precipitate (A) and the removal of supernatant liquid. The entirety of the supernatant liquid may be removed or only a portion thereof may be removed. In the case of the latter, the precipitate (A) with the supernatant liquid is provided to the subsequent step (II). The collection by the centrifugation is preferred in terms of allowing even smaller particles of the precipitate (A) to be provided to the subsequent step, so that a catalyst having a higher specific surface area is obtained and activity per unit mass of the catalyst becomes high.

The centrifugation is preferably carried out plural times (e.g., 2 to 7 times). That is, it is preferable to repeat the operations of the addition of water to the collected precipitate (A), (optionally stirring), the centrifugation, and the removal of the supernatant liquid. The precipitate (A) is purified by repeating the centrifugation.

The centrifugation is carried out under conditions such that, e.g., rotation number is 500 to 20000 rpm and time is 5 to 120 minutes.

The collection of the precipitate (A) by the filtration may be carried out by using filter paper or a filtration membrane or by repeating the operations of the addition of water to the collected precipitate (A), (optionally stirring), the filtration, and the removal of the filtrate with the use of an ultrafiltration membrane while purifying the precipitate (A).

This precipitate may be a gelatinous substance.

<Transition Metal Compound (1)>

A portion or the entirety of the transition metal compound (1) is a compound containing, as a transition metal element, at least one transition metal element M1 selected from the elements of group 4 and group 5 of the periodic table. Specific examples of the transition metal element M1 include titanium, zirconium, hafnium, niobium, vanadium, and tantalum. These may be used singly or in combination of two or more kinds.

Among the transition metal elements M1, from the viewpoint of a cost and the performance of the resultant catalyst, titanium, zirconium, niobium, and tantalum are preferred, and titanium and zirconium are further preferred. The reserves of these metals in the earth crust are particularly large and thus enable products to be steadily supplied, therefore leading to higher industrial advantage.

Specific examples of the transition metal compound (1) include metal sulfates, metal halides, metal alkoxides, metal acetates, metal phosphates, metal nitrates, metal organic acid salts, metal acid halides (intermediate hydrolysates of metal halides), metal perhalates, metal hypohalites, and metal complexes, and metal sulfates and metal halides are preferred.

Examples of the metal halides include chlorides, bromides, and iodides of the transition metals, and chlorides of the transition metals are preferred because of having high safety during use thereof.

As the metal alkoxides, methoxide, propoxide, isopropoxide, ethoxide, butoxide, and isobutoxide of the transition metals are preferred; and isopropoxide, ethoxide, and butoxide of the transition metals are further preferred. The metal alkoxide may have one kind of alkoxy group or may have two or more kinds of alkoxy groups.

Examples of the metal halides include chlorides, bromides, and iodides of the transition metals, and examples of the metal acid halides include acid chlorides, acid bromides, and acid iodides of the transition metals.

Examples of the metal acid halides include metal acid chlorides, examples of the metal perhalates include metal perchlorates, and examples of the metal hypohalites include metal hypochlorites.

Specific examples of the transition metal compound (1) include:

titanium compounds such as titanium sulfate, titanium tetrachloride, titanium trichloride, titanium tetrabromide, titanium tribromide, titanium tetraiodide, titanium triiodide, titanium tetramethoxide, titanium tetraethoxide, titanium tetrapropoxide, titanium tetraisopropoxide, titanium tetrabutoxide, titanium tetraisobutoxide, titanium tetrapentoxide, titanium acetates such as titanium tetraacetate, titanium dioxide, titanium oxides having 1 or more and 2 or less oxygen atoms based on one titanium atom, titanium tetraacetylacetonate, titanium oxydiacetylacetonate, bis[tris(2, 4-pentanedionato)titanium(IV)] hexachlorotitanate(IV) ([Ti (acac)$_3$]$_2$[TiCl$_6$]), titanium oxychloride, titanium oxybromide, titanium oxyiodide, titanium nitrate, and titanium oxynitrate;

niobium compounds such as niobium sulfate, niobium pentachloride, niobium pentabromide, niobium pentaiodide, niobium pentamethoxide, niobium pentaethoxide, niobium pentaisopropoxide, niobium pentabutoxide, niobium pentapentoxide, niobium pentoxide, niobium oxides having 2.5 or less oxygen atoms based on one niobium atom, niobium oxychloride, niobium oxybromide, niobium oxyiodide, niobium nitrate, and niobium oxynitrate;

zirconium compounds such as zirconium sulfate, zirconium tetrachloride, zirconium tetrabromide, zirconium tetraiodide, zirconium tetramethoxide, zirconium tetraethoxide, zirconium tetrapropoxide, zirconium tetraisopropoxide, zirconium tetrabutoxide, zirconium tetraisobutoxide, zirconium tetrapentoxide, zirconium tetraacetate, zirconium dioxide, zirconium oxides having 1 or more and 2 or less oxygen atoms based on one zirconium atom, zirconium tetraacetylacetonate, zirconium oxychloride, zirconium oxybromide, zirconium oxyiodide, zirconium nitrate, and zirconium oxynitrate;

tantalum compounds such as tantalum sulfate, tantalum pentachloride, tantalum pentabromide, tantalum pentaiodide, tantalum pentamethoxide, tantalum pentaethoxide, tantalum pentaisopropoxide, tantalum pentabutoxide, tantalum pentapentoxide, tantalum pentaacetate, tantalum pentoxide, tantalum oxides having 2.5 or less oxygen atoms based on one tantalum atom, tantalum tetraethoxyacetylacetonate, tantalum oxychloride, tantalum oxybromide, tantalum oxyiodide, and tantalum nitrate;

vanadium compounds such as vanadium oxysulfate, vanadium pentachloride, vanadium pentabromide, vanadium pentaiodide, vanadium oxide trimethoxide, vanadium oxide triethoxide, vanadium oxide triisopropoxide, vanadium oxide tributoxide, vanadium oxide, vanadium oxides having 2.5 or less oxygen atoms based on one vanadium atom, vanadium(III) acetylacetonate, vanadium(V) acetylacetonate, vanadium oxytrichloride, vanadium oxybromide, vanadium oxyiodide, vanadium nitrate, and vanadium oxynitrate; and hafnium compounds such as hafnium sulfate, hafnium tetrachloride, hafnium bromide, hafnium iodide, hafnium tetramethoxide, hafnium tetraethoxide, hafnium tetrapropoxide, hafnium tetraisopropoxide, hafnium tetrabutoxide, hafnium tetraisobutoxide, hafnium tetrapentoxide, hafnium acetate, hafnium dioxide, hafnium oxides having 1 or more and 2 or less oxygen atoms based on one hafniumatom, hafnium tetraacetylacetonato, hafnium oxychloride, hafnium oxybromide, hafnium oxyiodide, hafnium nitrate, and hafnium oxynitrate. These may be used singly or in combination of two or more kinds.

Among these compounds, titanium sulfate, titanium tetrachloride, niobium sulfate, niobium pentachloride, zirconium sulfate, zirconium tetrachloride, zirconium oxychloride, tantalum sulfate, and tantalum pentachloride are preferred; and titanium sulfate and titanium tetrachloride are further preferred.

<Transition Metal Compound (2)>

The aqueous solution of the transition metal compound (1) may be brought into contact with ammonia and/or ammonia water in the presence of a transition metal compound (2). As this transition metal compound (2), there is used a transition metal compound that is different from the transition metal compound (1) and contains, as a transition metal element, at least one transition metal element M2 selected from iron, nickel, chromium, cobalt, and manganese (hereinafter also referred to as "transition metal element M2" or "M2"). The performance of the resultant catalyst is improved by using the transition metal compound (2).

As the transition metal element M2, iron and chromium are preferred, and iron is further preferred, because of having high catalyst performance per unit cost.

Specific examples of the transition metal compound (2) include:

iron compounds such as iron(II) chloride, iron(III) chloride, iron(III) sulfate, iron(II) sulfide, iron(III) sulfide, potassium ferrocyanide, potassium ferricyanide, ammonium ferrocyanide, ammonium ferricyanide, iron ferrocyanide, iron (II) nitrate, iron(III) nitrate, iron(II) oxalate, iron(III) oxalate, iron(II) phosphate, iron(III) phosphate, ferrocene, iron(II) hydroxide, iron(III) hydroxide, iron(II) oxide, iron (III) oxide, triiron tetraoxide, iron(II) acetate, iron(II) lactate, and iron(III) citrate;

nickel compounds such as nickel(II) chloride, nickel(II) sulfate, nickel(II) sulfide, nickel(II) nitrate, nickel(II) oxalate, nickel(II) phosphate, nickelocene, nickel(II) hydroxide, nickel(II) oxide, nickel(II) acetate, and nickel(II) lactate;

chromium compounds such as chromium(II) chloride, chromium(III) chloride, chromium(III) sulfate, chromium (III) sulfide, chromium(III) nitrate, chromium(III) oxalate, chromium(III) phosphate, chromium(III) hydroxide, chromium(II) oxide, chromium(III) oxide, chromium(IV) oxide, chromium(VI) oxide, chromium(II) acetate, chromium(III) acetate, and chromium(III) lactate;

cobalt compounds such as cobalt(II) chloride, cobalt(III) chloride, cobalt(II) sulfate, cobalt(II) sulfide, cobalt(II) nitrate, cobalt(III) nitrate, cobalt(II) oxalate, cobalt(II) phosphate, cobaltocene, cobalt(II) hydroxide, cobalt(II) oxide, cobalt(III) oxide, tricobalt tetroxide, cobalt(II) acetate, and cobalt(II) lactate; and manganese compounds such as manganese(II) chloride, manganese(II) sulfate, manganese(II) sulfide, manganese(II) nitrate, manganese(II) oxalate, manganese(II) hydroxide, manganese(II) oxide, manganese(III) oxide, manganese(II) acetate, manganese(II) lactate, and manganese citrate. These may be used singly or in combination of two or more kinds.

Among these compounds, iron(II) chloride, iron(III) chloride, potassium ferrocyanide, potassium ferricyanide, ammonium ferrocyanide, ammonium ferricyanide, iron(II) acetate, iron(II) lactate, nickel(II) chloride, nickel(II) acetate, nickel(II) lactate, chromium(II) chloride, chromium(III) chloride, chromium(II) acetate, chromium(III) acetate, chromium(III) lactate, cobalt(II) chloride, cobalt(III) chloride, cobalt(II) acetate, cobalt(II) lactate, manganese(II) chloride, manganese(II) acetate, and manganese(II) lactate are preferred since the activity of a catalyst obtained with the compound as a raw material becomes high;

iron(II) chloride, iron(III) chloride, potassium ferrocyanide, potassium ferricyanide, ammonium ferrocyanide, ammonium ferricyanide, iron(II) acetate, iron(II) lactate, chromium(II) chloride, chromium(III) chloride, chromium(II) acetate, chromium(III) acetate, or chromium(III) lactate is further preferred since the activity of a catalyst obtained with the compound as a raw material extremely becomes high.

(Step (II))

In the step (II), at least the precipitate (A), an organic compound (B) (described in detail below), and a liquid medium (C) are mixed to prepare a catalyst precursor liquid.

The mixing operation may be carried out by: mixing the organic compound (B) and the liquid medium (C) to prepare a solution (or dispersion) of the organic compound (B); and then mixing the solution (or the dispersion) and the precipitate (A). By mixing the precipitate (A) and the organic compound (B) in the presence of the liquid medium (C), these can be mixed evenly.

The precipitate (A) may be added little by little to the solution or dispersion of the organic compound (B) (i.e., the whole amount is not added at a time).

In the step (II), the precipitate (A), the organic compound (B), and the liquid medium (C) may be put in a pressure-applicable container such as an autoclave and mixed with being pressurized at a pressure of ordinary pressure or more.

<Organic Compound (B)>

Examples of the organic compound (B) include:

sugars such as glucose, fructose, sucrose, cellulose, and hydroxypropyl cellulose;

amino sugars such as glucosamine, acetylglucosamine, galactosamine, acetylneuramic acid, fructosamine, muramyldipeptide, and ketosamine;

glycosaminoglycans such as hyaluronic acid, chondroitin-4-sulfate, chondroitin-6-sulfate, heparin, keratan sulfate, and dermatan sulfate;

polyvinyl alcohols;

nitrogen-containing polymer compounds such as polyvinylpyrrolidone, polyaniline, polypyrrole, and polypyridine;

polyalkylene glycols such as polyethylene glycol and polypropylene glycol;

polyesters such as polyethylene terephthalate;

nitrile group-containing compounds such as acrylonitrile and polyacrylonitrile;

amino acids such as glycine, alanine, and methionine;

organic acids such as ascorbic acid, citric acid, and stearic acid; and the like.

Of these, a polymer compound containing a nitrogen atom in the molecule (hereinafter also referred to as "nitrogen-containing polymer compound") and an amino acid are preferred, and polyvinylpyrrolidone, glucosamine, and glycine are further preferred.

As the organic compound (B), any of an organic compound containing nitrogen in the molecule (nitrogen-containing organic compound) and an organic compound that does not contain nitrogen in molecule may be used.

The ratio (B/A) of the total number B of the carbon atoms of the organic compound (B) used in the step (II) to the total number A of the atoms of the transition metal elements of the transition metal compounds used in the production method of the present invention (i.e., the transition metal compound (1) used in the step (II) and a transition metal compound (2) optionally used in the step (III) described below) is preferably 1 or more and 200 or less, more preferably 1.5 or more and 150 or less, 2 or more and 130 or less, further preferably 3 or more and 80 or less, further more preferably 4 or more and 60 or less, particularly preferably 5 or more and 30 or less, in terms of allowing the heat treatment in the step (IV) to be performed while decreasing components eliminating as carbon compounds such as carbon dioxide and carbon monoxide, i.e., decreasing an emission gas during catalyst production and in terms of allowing a resultant catalyst to have high activity.

When the organic compound (B) is a nitrogen-containing organic compound, the ratio (C/A) of the total number C of the nitrogen atoms of the nitrogen-containing organic compound used in the step (II) to the total number A of the atoms of the transition metal elements of the transition metal compounds used in the production method of the present invention (i.e., the transition metal compound (1) used in the step (II) and a transition metal compound (2) optionally used in the step (III) described below) is preferably 1 or more and 28 or less, more preferably 1.5 or more and 17 or less, further preferably 2 or more 12 or less, more further preferably 2.5 or more and 10 or less, particularly preferably 3.5 or more and 8.5 or less, from the viewpoint of obtaining a catalyst with good oxygen reduction activity.

<Liquid Medium (C)>

Examples of the liquid medium (C) include water, alcohols, and aqueous solution or alcohol solution of acids. As the alcohols, preferred are ethanol, methanol, butanol, propanol, and ethoxyethanol; and further preferred are ethanol and methanol. As the acids, acetic acid, nitric acid, hydrochloric acid, phosphoric acid, and citric acid are preferred; and when these acids are liquid, these may be used without being processed or may be used in the form of an aqueous solutions or an alcohol solution. As the acids, acetic acid and nitric acid are further preferred since the oxygen reduction activity of a resultant catalyst is enhanced. Water, alcohols, and acids (also including aqueous solution or alcohol solution) may be used singly or in combination of two or more kinds.

<Transition Metal Compound (2)>

In the step (II), the transition metal compound (2) as well as the precipitate (A), the organic compound (B), and the liquid medium (C) may be further mixed. The performance of the resultant catalyst is improved by using the transition metal compound (M2).

The mixing operation in the case of mixing the transition metal compound (2) may be carried out by: mixing the organic compound (B), the transition metal compound (2), and the liquid medium (C) to prepare a solution (or dispersion); and then mixing the solution (or the dispersion) and the precipitate (A).

(Step (III))

In the step (III) optionally carried out prior to the step (IV), the liquid medium (C) (in the case of providing the precipitate (A) with supernatant liquid to the step (II), also the supernatant liquid) is removed from the catalyst precursor liquid obtained in the step (II).

The removal of the liquid medium (C) may be performed in air, or may be performed under an atmosphere of an inert gas (for example, nitrogen, argon, helium). It is preferable to use the inert gas since the activity of the resultant catalyst becomes high; among the inert gases, from the viewpoint of a cost, nitrogen and argon are preferred; and nitrogen is more preferred.

The temperature in the removal of the liquid medium (C) may be ordinary temperature when the vapor pressure of the liquid medium (C) is large, but from the viewpoint of mass production of the catalyst, temperature is preferably 30° C. or more, more preferably 40° C. or more, further preferably 50° C. or more; and from the viewpoint of preventing the decomposition of the catalyst precursor contained in the liquid obtained in the step (II), the temperature is preferably 250° C. or less, more preferably 150° C. or less, further preferably 110° C. or less.

The removal of the liquid medium (C) may be performed under atmospheric pressure when the vapor pressure of the liquid medium (C) is high, but is preferably performed under reduced pressure (e.g., 0.1 Pa to 0.1 MPa) in order to remove the liquid medium (C) within a shorter period of time. For the removal of the liquid medium (C) under reduced pressure, for example, an evaporator may be used.

The removal of the liquid medium (C) may be performed with the mixture obtained in the step (II) being allowed to standstill. In order to obtain a more homogenous solid residue, preferred is the removal of the liquid medium (C) with the mixture being rotated.

When the weight of a container holding the mixture is large, it is preferable that the solution is rotated using a stirring rod, a stirring blade, a stirring bar, or the like.

When the removal of the liquid medium (C) is performed while regulating the vacuum degree of a container holding the mixture, in which case the drying is performed in a sealable container, it is preferable that the removal of the liquid medium (C) is performed while the whole container is rotated: for example, it is preferable that the removal of the liquid medium (C) is performed using e.g., a rotary evaporator.

Depending on a method for removing the liquid medium (C), the properties of the organic compound (B), or the like, the solid residue obtained in the step (III) may have a non-uniform composition or be at a non-uniform agglomeration state. In this case, the solid residue may be subjected to mixing and crushing to obtain more uniform and finer powders to be used in the step (IV), whereby a catalyst can be obtained which has more uniform particle diameter.

For the mixing and crushing of the solid residue, for example, a roll-rotating mill, a ball mill, a small-diameter ball mill (bead mill), a medium-stirring mill, an air flow crusher, a mortar, an automatic kneading mortar, a crushing tank, or a jet mill is employable; when the solid residue has been provided in a small amount, a mortar, an automatic kneading mortar, or a batch-type ball mill is preferably used. When the solid residue has been provided in a large amount and is to be subjected to continuous mixing or crushing treatment, a jet mill is preferably used.

(Step (IV))

In the step (IV), a solid in the catalyst precursor liquid is subjected to heat treatment.

In the heat treatment, the catalyst precursor liquid containing the solid obtained in the step (II) may be heat-treated without being processed or the solid residue obtained in the step (III) may be heat-treated.

The temperature in this heat treatment is 500 to 1200° C., preferably 600 to 1100° C., more preferably 700 to 1050° C.

If the temperature in this heat treatment is excessively higher than the above range, sintering and grain growth occur between particles of the resultant heat-treated product, consequently decreasing the specific surface area of the electrode catalyst, and therefore poor processability is caused when the particles are processed to a catalyst layer by a coating method. On the other hand, if the temperature in this heat treatment is excessively lower than the above range, an electrode catalyst having high activity cannot be obtained.

Examples of methods of the heat treatment method include a standing method, a stirring method, a dropping method, and a powder capturing method.

The standing method is a method in which the solid residue obtained in the step (III) is placed in a stationary electric furnace or the like and is heated. During the heating, the solid residue that has been weighed may be put in a ceramic container such as an alumina board or a quartz board. The standing method is preferable in view of being able to heat a large amount of the solid residue.

The stirring method is a method in which the solid residue is put in an electric furnace such as a rotary kiln and is heated while being stirred. The stirring method is preferable in view of being able to heat a large amount of the solid residue and in view of being able to prevent the aggregation and growth of the particles of the resultant electrode catalyst. Furthermore, the stirring method is preferable in view of being able to continuously produce the electrode catalyst by sloping a furnace.

The dropping method is a method in which an induction furnace is heated to a predetermined heating temperature while flowing, e.g., an inert gas containing a very small amount of an oxygen gas as an atmosphere gas through the furnace, a thermal equilibrium is maintained at the temperature, and thereafter the solid residue is dropped and heated in a crucible which is a heating zone in the furnace. The dropping method is preferable in view of being able to minimizing the aggregation and growth of the particles of the resultant electrode catalyst.

The powder capturing method is a method in which the solid residue is caused to suspend as particles in an inert gas atmosphere containing a trace amount of an oxygen gas and the solid residue is captured and heated in a vertical tubular furnace kept at a predetermined heating temperature.

When the heat treatment is performed by the standing method, a temperature-raising rate, which is not particularly limited, is preferably around 1° C./min to 100° C./min, more preferably 5° C./min to 50° C./min. Further, the heating time is preferably 0.1 to 10 hours, more preferably 0.5 to 5 hours, further preferably 0.5 to 3 hours. When the heating by the standing method is performed in a tubular furnace, the time of heating electrode catalyst particles is 0.1 to 10 hours, preferably 0.5 hour to 5 hours. The heating time in this range is preferred in view of leading to the formation of uniform electrode catalyst particles and allowing a catalyst having high activity to be obtained.

Under the stirring method, the heating time of the solid residue is usually 10 minutes to 5 hours, preferably 30 minutes to 2 hours. Under this method, when the solid residue is continuously heated, for example, by sloping the furnace, the heating time is defined as a mean residence time calculated from the sample flowing amount in a steady furnace.

Under the dropping method, the heating time of the solid residue is usually 0.5 to 10 minutes, preferably 0.5 to 3 minutes. The heating time within this range leads to the tendency of the formation of uniform electrode catalyst particles.

Under the powder capturing method, the heating time of the solid residue is 0.2 second to 1 minute, preferably 0.2 to 10 seconds. The heating time within this range leads to the tendency of the formation of uniform electrode catalyst particles.

When the heat treatment is performed under the standing method, a heating furnace employing LNG (liquefied natural gas), LPG (liquefied petroleum gas), light oil, heavy oil, electricity, or the like as a heat source may be used as a heat treatment apparatus. In this case, since the atmosphere in heat treatment of the solid residue is important in the present invention, a preferable apparatus is not a heating apparatus that holds fuel flame within the furnace and thereby provides heating from the inside of the furnace, but a heating apparatus that provides heating from the outside of the furnace.

When a heating furnace is used which provides the solid residue in an amount of 50 kg or more per one batch, from the viewpoint of a cost, a heating furnace employing LNG or LPG as a heat source is preferable.

When an electrode catalyst having particularly high catalytic activity is desired, it is preferable to use an electric furnace employing electricity as a heat source, which allows for the strict controlling of temperature.

Exemplary shapes of the furnace include a tubular furnace, a top-loading furnace, a tunnel furnace, a box furnace, a sample table elevating-type furnace (elevator furnace), a car-bottom furnace, and the like; of these, preferred are a tubular furnace, a top-loading furnace, a box furnace, and a sample table elevating-type furnace, which allow for the particular strict controlling of atmosphere; and preferred are a tubular furnace and a box furnace.

When the stirring method is adopted, the above heat source is also employable; however, especially when the solid residue is continuously heat-treated by the stirring method using a inclined rotary kiln, it is likely that the equipment size becomes larger and a large amount of energy is needed; and thus it is preferable to use a heat source derived from fuels such as LPG.

The atmosphere in performing the heat treatment is preferably nitrogen, argon, and helium, further preferably nitrogen and argon, from the viewpoint of allowing the resultant electrode catalyst to have increased activity. These may be used singly or in combination of two or more kinds.

When the organic compound (B) is an organic compound that does not contain nitrogen in the molecule, it is preferable to perform the heat treatment at a temperature of 800° C. or more under the atmosphere of a nitrogen gas from the viewpoint of allowing the resultant electrode catalyst to have increased activity.

The presence of a reactive gas in the atmosphere in performing the heat treatment may allow the resultant electrode catalyst to have higher catalytic performance. Examples of the reactive gas include carbon-containing gases such as oxygen gas, hydrogen gas, and methane; and nitrogen-containing gases such as ammonia.

When the atmosphere in performing the heat treatment contains a hydrogen gas, the concentration of the hydrogen gas is, for example, 100% by volume or less, preferably 0.01 to 10% by volume, more preferably 1 to 5% by volume.

When the atmosphere in performing the heat treatment contains an oxygen gas, the concentration of the oxygen gas is, for example, 0.01 to 10% by volume, preferably 0.01 to 5% by volume.

After the heat treatment, a heat-treated product may be crushed. Performing the crushing may improve the processability in using the resultant electrode catalyst to produce an electrode, and the properties of the resultant electrode. For the crushing, for example, a roll-rotating mill, a ball mill, a small-diameter ball mill (bead mill), a medium-stirring mill, an air flow crusher, a mortar, an automatic kneading mortar, a crushing tank, or a jet mill may be used. When the electrode catalyst has been provided in a small amount, a mortar, an automatic kneading mortar, or a batch-type ball mill is preferred; and when the heat-treated product is to be continuously treated in a large amount, a jet mill or a continuous-type ball mill is preferred, and among the continuous-type ball mills, a bead mill is further preferred.

[Fuel Cell Electrode Catalyst]

The fuel cell electrode catalyst of the present invention is produced by the above-described method for producing a fuel cell electrode catalyst of the present invention (hereinafter, the fuel cell electrode catalyst produced by the above-described method for producing a fuel cell electrode catalyst of the present invention is also referred to simply as "catalyst").

When the proportions of the number of atoms of a transition metal element (the transition metal element M1 and the transition metal element M2 are not distinguished from each other), carbon, nitrogen and oxygen that constitute the catalyst is represented in such a manner as the transition metal element:carbon:nitrogen:oxygen=1:x:y:z, the following is preferably satisfied: $0<x\le7$, $0<y\le2$, and $0<z\le3$.

In terms of allowing the electrode catalyst to have high activity, the range of x is more preferably $0.15\le x\le5.0$, further preferably $0.2\le x\le4.0$, particularly preferably $1.0<x\le3.0$; the range of y is more preferably $0.01\le y\le1.5$, further preferably $0.02\le y\le0.5$, particularly preferably $0.03\le y\le0.4$; and the range of z is more preferably $0.6\le z\le2.6$, further preferably $0.9\le z\le2.0$, particularly preferably $0.95\le z\le1.5$.

In the case where the catalyst contains, as the transition metal element, one transition metal element M1 selected from the group consisting of the group 4 and the group 5 elements of the periodic table and at least one transition metal element M2 selected from iron, nickel, chromium, cobalt, and manganese, when the proportions of the number of atoms of the transition metal element M1, the transition metal element M2, carbon, nitrogen, and oxygen that constitute the catalyst are represented in such a manner as the transition metal element M1: the transition metal element M2: carbon:nitrogen:oxygen=(1−a):a:x:y:z, the following is preferably satisfied: $0<a\leq0.5$, $0<x\leq7$, $0<y\leq2$, and $0<z\leq3$. The catalyst, by containing M2 in this proportion, has higher performance.

In terms of allowing the electrode catalyst to have high activity, preferable ranges of x, y, and z are as described above; and the range of a is more preferably $0.01\leq a\leq0.5$, further preferably $0.015\leq a\leq0.4$, particularly preferably $0.02\leq a\leq0.2$.

The values of a, x, y, and z are those as measured by the method adopted in Examples described later.

As a result of the presence of the transition metal element M2 (metal element that is at least one element selected from iron, nickel, chromium, cobalt, and manganese), the following (1) to (4) are presumed.

(1) The transition metal element M2 or the transition metal compound (M2) is presumed to work as a catalyst for forming a bond between the transition metal element M1 atom and a nitrogen atom in the nitrogen-containing organic compound during the synthesis of the electrode catalyst.

(2) Even when the electrode catalyst is used at such a high potential under such a highly oxidative atmosphere as to cause the elution of the transition metal element M1, the transition metal element M2 is presumed to be passivated to prevent further elution of the transition metal element M1.

(3) In the heat treatment of the step (IV), the sintering of the heat-treated product, i.e., the decrease in a specific surface area of the heat-treated product is presumed to be prevented.

(4) The presence in the electrode catalyst of the transition metal element M1 and the transition metal element M2 is presumed to cause the bias of charge at a part where both metal elements are adjacent to each other, thereby leading to adsorption or reaction of reactants or elimination of products that would not be achievable by the electrode catalyst containing the transition metal element M1 alone as a metal element.

The catalyst of the present invention preferably has a transition metal element atom, a carbon atom, a nitrogen atom and an oxygen atom, and has a crystalline structure of an oxide, a carbide or a nitride of the transition metal element, or a plurality of crystalline structures thereof. The results of the study of the crystalline structures by X-ray diffraction analysis and the elemental analysis of the catalyst lead to the presumption that the catalyst has an oxide structure of the transition metal element with the site of the oxygen atom of the oxide structure being substituted with a carbon atom or nitrogen atom; or has a carbide, nitride or carbonitride structure of the transition metal element with the site of the carbon atom or the nitrogen atom being substituted with an oxygen atom; or has a mixed structure containing such structures.

<BET Specific Surface Area>

According to the method for producing a fuel cell electrode catalyst of the present invention, a fuel cell electrode catalyst having a large specific surface area is produced, and the specific surface area as calculated by BET method of the catalyst of the present invention is preferably 30 to 350 $m^2/g$, more preferably 50 to 300 $m^2/g$, further preferably 100 to 300 $m^2/g$. The specific surface area within the above range preferably allows the catalyst to have high activity since the structure of the catalyst is more preferably maintained and, furthermore, a surface area per unit weight is large.

The oxygen reduction current density of the fuel cell electrode catalyst produced by the production method of the present invention can be determined in such as manner as described below. That is, from the result of a measurement method (A) described below, a difference between the reduction current under oxygen atmosphere and the reduction current under nitrogen atmosphere at a specific potential (e.g., 0.7 V) is calculated, and the calculated value is further divided by an area of the electrode to provide a value and this value is defined as an oxygen reduction current density $(mA/cm^2)$.

[Measurement Method (A):

A catalyst and carbon are added to a solvent so that the catalyst dispersed in the carbon being electron conductive particles accounts for 1% by mass. The mixture is ultrasonically stirred to give a suspension. The carbon source herein is carbon black (specific surface area: 100-300 $m^2/g$) (e.g., XC-72 manufactured by Cabot Corporation), and the catalyst is dispersed therein with a catalyst:carbon mass ratio of 95:5. The solvent is a mixture of isopropyl alcohol:water (=2:1 by mass).

While ultrasonicating the suspension, a 10 μL portion thereof is collected and is quickly dropped on a glassy carbon electrode (diameter: 5.2 mm) and dried at 120° C. for 5 minutes to form a fuel cell catalyst layer containing the catalyst on the glassy carbon electrode. This dropping and drying operation is performed until 1.0 mg or more of the fuel cell catalyst layer is formed on the carbon electrode surface.

Subsequently, 10 μL of a 5% NAFION (registered trademark) solution (DuPont, DE521) diluted ten times with isopropyl alcohol is further dropped on the fuel cell catalyst layer and is dried at 120° C. for 1 hour.

Using the electrode manufactured above, polarization is carried out in a 0.5 mol/L sulfuric acid aqueous solution at 30° C. under an oxygen atmosphere and a nitrogen atmosphere at a potential scanning rate of 5 mV/sec, thereby recording a current-potential curve.]

The oxygen reduction current density of the fuel cell electrode catalyst produced by the production method of the present invention at 0.7 V (vs RHE) is preferably 0.08 $mA/cm^2$ or more and 10 $mA/cm^2$ or less, more preferably 0.1 $mA/cm^2$ or more and 9 $mA/cm^2$ or less, further preferably 0.2 $mA/cm^2$ or more and 8 $mA/cm^2$ or less, particularly preferably 0.3 $mA/cm^2$ or more and 7 $mA/cm^2$ or less, for use as a polymer electrolyte fuel cell air electrode catalyst.

[Uses]

The fuel cell electrode catalyst produced by the production method of the present invention can be used as a catalyst alternative to a platinum catalyst.

The fuel cell catalyst layer produced by the method for producing a fuel cell electrode catalyst layer of the present invention comprises the catalyst.

Fuel cell catalyst electrode layers include anode catalyst layers and cathode catalyst layers, and the catalyst may be used in any one of these layers. Because the catalyst has excellent durability and high oxygen reducing ability, it is preferably used in cathode catalyst layers.

The fuel cell electrode catalyst layer of the present invention preferably further comprises an electron conductive powder. When the fuel cell electrode catalyst layer comprising the catalyst further comprises the electron conductive powder, the reduction current can be more increased. It is considered that the electron conductive powder increases the reduction current because of allowing the catalyst to have an electrical bond for inducing electrochemical reaction.

The electron conductive particles are usually used as a carrier of the catalyst.

Although the catalyst has conductivity to some degree, in order for the catalyst to be given more electrons or in order for a reactant to receive many electrons from the catalyst, the catalyst, in order to be provided with conductivity, may be mixed with carrier particles. The carrier particles may be mixed into the catalyst produced after subjected to the step (I) to the step (IV), or may be mixed in any stage of from the step (II) to the step (IV).

Examples of materials of the electron conductive particles include carbon, conductive polymers, conductive ceramics, metals, and conductive inorganic oxides such as tungsten oxide and iridium oxide, and these materials can be used singly or in combination with one another. In particular, carbon or a mixture of carbon and other electron conductive particles is preferred, since the electron conductive particles composed of carbon have a large specific surface area, those having a small particle diameter are easily available inexpensively, and they are excellent in chemical resistance and high-potential resistance. That is, the fuel cell catalyst layer preferably comprises the catalyst and carbon particles.

Examples of the carbon include carbon black, graphite, activated carbon, carbon nanotube, carbon nanofiber, carbon nanohorn, fullerene, porous carbon, graphene, and the like. If the particle diameter of the electron conductive particles composed of carbon is excessively small, an electron conductive path is not readily formed, while if the particle diameter is within the following ranges, the fuel cell catalyst layer has more improved gas diffusion properties or the catalyst usage rate is more improved, and, therefore, the particle diameter of the electron conductive particles composed of carbon is preferably 10 to 1000 nm, more preferably 10 to 100 nm.

When the electron conductive particles are composed of carbon, the weight ratio of the catalyst to the electron conductive particles (catalyst:electron conductive particles) is preferably 4:1 to 1000:1.

The conductive polymers are not particularly limited but examples thereof include polyacetylene, poly-p-phenylene, polyaniline, polyalkylaniline, polypyrrole, polythiophene, polyindole, poly-1,5-diaminoanthraquinone, polyaminodiphenyl, poly(o-phenylenediamine), poly(quinolinium) salt, polypyridine, polyquinoxaline, polyphenylquinoxaline, and the like. Of these, polypyrrole, polyaniline, and polythiophene are preferred, and polypyrrole is more preferred.

The fuel cell electrode catalyst layer preferably further comprises a polymer electrolyte. The polymer electrolytes are not particularly limited as long as being those commonly used in fuel cell catalyst layers. Specific examples thereof include perfluorocarbon polymers having a sulfonic acid group (such as NAFION (registered trademark)), hydrocarbon polymer compounds having a sulfonic acid group, polymer compounds doped with inorganic acids such as phosphoric acid, organic/inorganic hybrid polymers partially substituted with proton conductive functional groups, and proton conductors composed of a polymer matrix impregnated with a phosphoric acid solution or a sulfuric acid solution. Of these, NAFION (registered trademark) is preferable. Examples of the source of NAFION (registered trademark) informing the fuel cell catalyst layer include a 5% NAFION (registered trademark) solution (DE521, DuPont) and the like.

The fuel cell electrode catalyst layer may be used as an anode catalyst layer or a cathode catalyst layer. The fuel cell electrode catalyst layer of the present invention comprises the catalyst that has high oxygen reducing ability and is resistant to corrosion in acidic electrolytes even at high potential and is therefore useful as a catalyst layer provided in a cathode of a fuel cell (as a cathode catalyst layer). In particular, the catalyst layer is preferably provided in a cathode of a membrane electrode assembly in a polymer electrolyte fuel cell.

The catalyst may be dispersed on the electron conductive particles serving as a carrier by methods such as airborne dispersion methods and in-liquid dispersion methods. The in-liquid dispersion methods are preferable because a dispersion of the catalyst and the electron conductive particles in a solvent can be used in the step for forming a fuel cell catalyst layer. Exemplary in-liquid dispersion methods include a method using orifice-choked flow, a method using rotational shear flow, a method using ultrasonic, and the like. The solvents used in the in-liquid dispersion methods are not particularly limited as long as the catalysts or the electron conductive particles are not corroded and are dispersed therein. Volatile liquid organic solvents, water or the like are generally used.

When the catalyst is dispersed on the electron conductive particles, the electrolyte described above and a dispersant may be further dispersed together.

The fuel cell catalyst layer may be formed by any methods without limitation. For example, a suspension containing the catalyst, the electron conductive particles, and the electrolyte may be applied to an electrolyte membrane or a gas diffusion layer as described later. The application methods include dipping, screen printing, roll coating, spraying, and the like. In another embodiment, a suspension containing the catalyst, the electron conductive particles, and the electrolyte may be applied or filtered on a substrate to form a fuel cell catalyst layer, and the catalyst layer may be transferred to an electrolyte membrane.

The electrode produced by the method for producing an electrode of the present invention comprises the fuel cell catalyst layer and a porous support layer.

The electrode may be used as any electrode of a cathode or an anode. The electrode of the present invention has excellent durability and high catalytic performance, and therefore using the electrode as a cathode leads to higher industrial advantage.

The porous support layer is a layer which diffuses gas (hereinafter also referred to as a "gas diffusion layer"). The gas diffusion layer is not limited as long as having electron conductivity, high gas diffusion properties, and high corrosion resistance. Carbon-based porous materials such as carbon paper and carbon cloth, and stainless steel and anticorrosive-coated aluminum foils for weight reduction are generally used as the gas diffusion layer.

The membrane electrode assembly produced by the method for producing a membrane electrode assembly of the present invention comprises a cathode, an anode, and an electrolyte membrane interposed between the cathode and the anode, wherein at least one of the cathode and the anode is the electrode produced by the method for producing an electrode of the present invention.

As the electrolyte membranes, perfluorosulfonic acid-based electrolyte membranes or hydrocarbon electrolyte membranes are generally used, and there may also be used membranes in which polymer microporous membranes are impregnated with liquid electrolyte; membranes in which porous bodies are filled with polymer electrolyte; or the like.

In addition, the fuel cell produced by the production method of the present invention comprises the membrane electrode assembly.

The electrode reaction in fuel cells takes place at a so-called three-phase interface (electrolyte-electrode catalyst-reactant gas). The fuel cells are classified according to the electrolytes used, into several types such as molten carbonate type (MCFC), phosphoric acid type (PAFC), solid oxide type (SOFC), polymer electrolyte type (PEFC), and the like. Especially, the membrane electrode assembly of the present invention is preferably used in polymer electrolyte fuel cells.

The fuel cell using the fuel cell electrode catalyst produced by the production method of the present invention has high performance and is considerably inexpensive as compared with platinum catalysts. The fuel cell has at least one function selected from the group consisting of electricity generating function, light emitting function, heat generating function, sound generating function, movement function, display function, and charging function and can improve the performance of an article, particularly a mobile particle, having a fuel cell. The fuel cell is held preferably on the surface or inside of the article. The fuel cell using the fuel cell electrode catalyst produced by the production method of the present invention has high activity per unit mass and is inexpensive, so that the fuel cell is enabled to be also carried by the above-described articles that have been conventionally difficult to carry a fuel cell and the article with a smaller volume can utilize a high power, thereby preferably leading to functional enhancement.

<Specific Examples of Articles Comprising Fuel Cell>

Specific examples of the articles that can comprise the fuel cell include architectural structures such as buildings, houses and tents, illumination equipment such as fluorescent light, LED, organic EL, streetlight, interior illumination and traffic light, machinery, automotive devices including vehicles, household appliances, agricultural equipment, electronic devices, mobile information terminals including mobile phones, beauty instruments, portable tools, sanitary goods such as bathroom goods and lavatory goods, furniture, toys, ornaments, bulletin boards, cool boxes, outdoor goods such as exterior generators, teaching materials, artificial flowers, items of artwork, power source for cardiac pacemakers and power source for heating and cooling apparatuses equipped with Peltier elements. The fuel cell using the fuel cell electrode catalyst produced by the production method of the present invention is useful since the fuel cell has high power performance per unit mass and is inexpensive, so that the fuel cell is enabled to be also carried by the articles that have been conventionally difficult to carry a fuel cell and wiring for power feeding can be omitted.

EXAMPLES

The present invention will be described in more detail below based on examples but the present invention is not limited to these examples.

In Examples and Comparative Examples, various measurements were performed by the following methods.

[Analytical Methods]

1. Powder X-ray Diffractometry

Samples were subjected to powder X-ray diffractometry using Rotaflex manufactured by Rigaku Corporation.

With regard to the counting of diffraction peaks in the powder X-ray diffractometry for each sample, a signal that was detected with a signal (S) to noise (N) ratio (S/N) of 2 or more was regarded as a single peak.

The noise (N) was the width of the baseline.

2. Elemental Analysis

Carbon: About 0.1 g of a sample was weighed and measured with a carbon/sulfur analyzer (EMIA-110 manufactured by HORIBA, Ltd.).

Nitrogen, oxygen: About 0.1 g of a sample was weighed, was sealed in Ni-Cup, and was then measured with an oxygen/nitrogen analyzer (TC600 manufactured by LECO).

Transition metal element (titanium, zirconium, iron): About 0.1 g of a sample was weighed in a platinum dish and an acid was added to decompose the sample by heating. This product decomposed by heating was quantitatively determined, then diluted, and quantitated with ICP-MS (HP7500 manufactured by Agilent).

Example 1

<Titanium Sulfate-PVP>

1. Production of Catalyst;

To distilled water, 9.12 g of 30% titanium (IV) sulfate aqueous solution (manufactured by Wako Pure Chemical Industries, Ltd.) was added, to prepare 100 ml of a titanium solution. A mixed liquid of 100 ml of 28% ammonia water and 200 ml of distilled water was prepared, and the above-described titanium solution was dropwise added to the mixed liquid to generate a precipitate (titanium compound). The reaction liquid was allowed to stand for 1 hour, and then supernatant liquid was removed with a dropping pipette so that 100 ml of the reaction liquid (containing the precipitate) remained. The reaction liquid containing the precipitate was centrifuged at 10000 rpm for 30 minutes, followed by removing supernatant liquid with a dropping pipette so that the precipitate and the supernatant liquid remained in an amount of 20 ml in total in a container. Then, a series of operations of adding 80 ml of pure water into the container, stirring the contents in the container, performing the centrifugation in the same manner as described above, and removing supernatant liquid in the same manner as described above was repeated three times to obtain 20 ml of liquid containing a gelatinous substance. Titanium hydroxide is considered to be contained in the gelatinous substance.

Then, 0.85 g of polyvinylpyrrolidone was dissolved in 100 ml of distilled water which was a liquid medium, 20 ml of the liquid containing the gelatinous substance was further added, and the resultant was stirred for 10 minutes to obtain a catalyst precursor liquid. The catalyst precursor liquid was heated and stirred with a rotary evaporator in a nitrogen atmosphere under reduced pressure with the temperature of a hot stirrer set at about 100° C., and thereby the water was slowly evaporated. The water was completely evaporated and the resultant solid residue was finely and homogenously crushed with a mortar, to obtain a powder for heat treatment.

This powder for heat treatment was put in a tubular furnace, was heated to 1000° C. under the atmosphere of a nitrogen gas at a temperature-raising rate of 10° C./min, was held at 1000° C. for 3 hours, and was allowed to natural cooling, to obtain a catalyst (1).

The BET specific surface area and elemental analysis results of the catalyst (1) are listed in Table 1.

2. Production of Fuel Cell Electrode;

Then, the catalyst (1) in an amount of 0.095 g and carbon (XC-72 manufactured by Cabot Corporation) in an amount of 0.005 g were added to 10 g of a solution obtained by mixing isopropyl alcohol and pure water at a mass ratio of isopropyl alcohol:pure water=2:1. The mixture was ultrasonically stirred to give a suspended mixture. On a glassy carbon electrode (diameter: 5.2 mm, manufactured by Tokai Carbon Co., Ltd.), 30 µl of this mixture was applied and was dried at 120° C. for 5 minutes, thereby forming 1.0 mg of a fuel cell catalyst layer on the carbon electrode surface. Furthermore, 10 µl of a 5% NAFION (registered trademark) solution (DuPont, DE521) diluted ten times with isopropyl alcohol was applied on the fuel cell catalyst layer and was dried at 120° C. for 1 hour to obtain a fuel cell electrode (1).

3. Evaluation of Oxygen Reducing Ability;

The fuel cell electrode prepared was subjected to polarization in a 0.5 mol/L sulfuric acid aqueous solution at 30° C. under an oxygen atmosphere and a nitrogen atmosphere at a potential scanning rate of 5 mV/sec to a less potential side, starting from 1.1V, thereby recording each current-potential curve. The current value was divided by each electrode area, and a value obtained by subtracting the current density observed in the nitrogen atmosphere from the current density observed in the oxygen atmosphere was defined as an oxygen reduction current density. As a reference electrode, a reversible hydrogen electrode was used in a sulfuric acid aqueous solution of the same concentration.

The oxygen reduction current density at 0.7 V is listed in Table 1. The higher the oxygen reduction current density is, the higher the catalytic performance of the catalyst in the fuel cell electrode is.

Example 2

<Titanium Sulfate-Glucosamine>

The same operation as in Example 1 was carried out, except that 0.85 g of polyvinylpyrrolidone was changed to 2.80 g of N-acetyl-D-glucosamine (Wako Pure Chemical Industries, Ltd., Purity: 90%), to obtain a catalyst (2).

The BET specific surface area and elemental analysis results of the catalyst (2) are listed in Table 1.

Further, the same operation as in Example 1 was carried out, except that the catalyst (1) was changed to the catalyst (2), to obtain a fuel cell electrode (2), and the oxygen reducing ability thereof was evaluated. The result is listed in Table 1.

Example 3

<Titanium Tetrachloride-Glucosamine>

The same operation as in Example 2 was carried out, except that 9.12 g of a 30% titanium sulfate aqueous solution was changed to 3.3 g of a titanium tetrachloride aqueous solution (titanium content: 16.5 mass %, manufactured by OSAKA Titanium. Technologies Co., Ltd.), to obtain a catalyst (3).

The BET specific surface area and elemental analysis results of the catalyst (3) are listed in Table 1.

Further, the same operation as in Example 1 was carried out, except that the catalyst (1) was changed to the catalyst (3), to obtain a fuel cell electrode (3), and the oxygen reducing ability thereof was evaluated. The result is listed in Table 1.

Example 4

<Titanium Sulfate-Glycine>

The same operation as in Example 1 was carried out, except that 0.85 g of polyvinylpyrrolidone was changed to 11.1 g of glycine (manufactured by Wako Pure Chemical Industries, Ltd., purity: 99%), to obtain a powder for heat treatment.

This powder for heat treatment was put in a tubular furnace, was heated to 900° C. under the atmosphere of a mixed gas of 4% by volume of hydrogen and 96% by volume of nitrogen at a temperature-raising rate of 10° C./min, was held at 900° C. for 3 hours, and was allowed to natural cooling, to obtain a catalyst (4).

The BET specific surface area and elemental analysis results of the catalyst (4) are listed in Table 1.

Further, the same operation as in Example 1 was carried out, except that the catalyst (1) was changed to the catalyst (4), to obtain a fuel cell electrode (4), and the oxygen reducing ability thereof was evaluated. The result is listed in Table 1.

Example 5

<Titanium Sulfate-Glycine-Iron>

The same operation as in Example 4 was carried out, except that 11.1 g of glycine was changed to 11.1 g of glycine (Wako Pure Chemical Industries, Ltd., purity: 99%) and 0.202 g of iron(II) acetate (manufactured by Aldrich, purity: 95%), to obtain a catalyst (5).

The BET specific surface area and elemental analysis results of the catalyst (5) are listed in Table 1.

Further, the same operation as in Example 1 was carried out, except that the catalyst (1) was changed to the catalyst (5), to obtain a fuel cell electrode (5), and the oxygen reducing ability thereof was evaluated. The result is listed in Table 1.

Example 6

<Titanium Sulfate-Glycine-Iron>

The same operation as in Example 5 was carried out, except that the heat treatment temperature was changed to 500° C., to obtain a catalyst (6).

The BET specific surface area and elemental analysis results of the catalyst (6) are listed in Table 1.

Further, the same operation as in Example 1 was carried out, except that the catalyst (1) was changed to the catalyst (6), to obtain a fuel cell electrode (6), and the oxygen reducing ability thereof was evaluated. The result is listed in Table 1.

Example 7

<Titanium Sulfate-Glycine-Iron>

The same operation as in Example 5 was carried out, except that the heat treatment temperature was changed to 1200° C., to obtain a catalyst (7).

The BET specific surface area and elemental analysis results of the catalyst (7) are listed in Table 1. Further, the same operation as in Example 1 was carried out, except that the catalyst (1) was changed to the catalyst (7), to obtain a fuel cell electrode (7), and the oxygen reducing ability thereof was evaluated. The result is listed in Table 1.

Example 8

<Titanium Sulfate-Glucose>

The same operation as in Example 1 was carried out, except that 0.85 g of polyvinylpyrrolidone was changed to 1.40 g of D(+)-glucose (Wako Pure Chemical Industries, Ltd., purity: 98%), to obtain a catalyst (8).

The BET specific surface area and elemental analysis results of the catalyst (8) are listed in Table 1.

Further, the same operation as in Example 1 was carried out, except that the catalyst (1) was changed to the catalyst (8), to obtain a fuel cell electrode (8), and the oxygen reducing ability thereof was evaluated. The result is listed in Table 1.

Example 9

<Titanium Sulfate-Polyvinyl Alcohol>

The same operation as in Example 1 was carried out, except that 0.85 g of polyvinylpyrrolidone was changed to 1.01 g of polyvinyl alcohol (Kanto Chemical Co. Inc., purity: 78%, polymerization degree n=2000), to obtain a catalyst (9).

The BET specific surface area and elemental analysis results of the catalyst (9) are listed in Table 1.

Further, the same operation as in Example 1 was carried out, except that the catalyst (1) was changed to the catalyst (9), to obtain a fuel cell electrode (9), and the oxygen reducing ability thereof was evaluated. The result is listed in Table 1.

Example 10

<Zirconium Oxynitrate-Glycine-Iron>

The same operation as in Example 5 was carried out, except that 9.12 g of the 30% titanium(IV) sulfate aqueous solution was changed to 1.51 g of zirconium oxynitrate dihydrate (Wako Pure Chemical Industries, Ltd., purity: 97%), to obtain a catalyst (10).

The BET specific surface area and elemental analysis results of the catalyst (10) are listed in Table 1.

Further, the same operation as in Example 1 was carried out, except that the catalyst (1) was changed to the catalyst (10), to obtain a fuel cell electrode (10), and the oxygen reducing ability thereof was evaluated. The result is listed in Table 1.

Example 11

<Niobium Ethoxide-Glycine-Iron>

The same operation as in Example 5 was carried out, except that 9.12 g of the 30% titanium(IV) sulfate aqueous solution was changed to 1.72 g of niobium(V) pentaethoxide (Wako Pure Chemical Industries, Ltd., purity: 99.9%) and the solvent was changed from water to ethanol, to obtain a catalyst (11).

The BET specific surface area and elemental analysis results of the catalyst (11) are listed in Table 1.

Further, the same operation as in Example 1 was carried out, except that the catalyst (1) was changed to the catalyst (11), to obtain a fuel cell electrode (11), and the oxygen reducing ability thereof was evaluated. The result is listed in Table 1.

Comparative Example 1

In a mortar, 2 g of titanium oxide (product name: SUPER-TITANIA F-6, Showa Denko K. K., anatase type, BET specific surface area: 100 m$^2$/g) and 0.75 g of carbon black (Vulcan XC72, Cabot Corporation) were thoroughly mixed; and the mixture was put in the tubular furnace, was heated to 1700° C. under the atmosphere of a mixed gas of 4% by volume of hydrogen and 96% by volume of nitrogen at a temperature-raising rate of 10° C./min, was held at 1700° C. for 3 hours, and was allowed to natural cooling, to obtain a powdery catalyst (c1).

The BET specific surface area and elemental analysis results of the catalyst (c1) are listed in Table 1. Further, the same operation as in Example 1 was carried out, except that the catalyst (1) was changed to the catalyst (c1), to obtain a fuel cell electrode (c1), and the oxygen reducing ability thereof was evaluated. The result is listed in Table 1.

Comparative Example 2

The same operation as in Example 4 was carried out, except that 20 ml of the liquid containing the gelatinous substance was changed to 1.18 g of amorphous titanium oxide (Wako Pure Chemical Industries, Ltd., amorphous, vapor phase synthesis (by the vapor phase method)), to obtain a catalyst (c2).

The BET specific surface area and elemental analysis results of the catalyst (c2) are listed in Table 1.

Further, the same operation as in Example 1 was carried out, except that the catalyst (1) was changed to the catalyst (c2), to obtain a fuel cell electrode (c2), and the oxygen reducing ability thereof was evaluated. The result is listed in Table 1.

Comparative Example 3

A powdery catalyst (c3) was obtained by heating 0.30 g of the catalyst (c1), obtained in Comparative Example 1, in a mixed gas of 1% by volume of oxygen, 4% by volume of hydrogen, and 95% by volume of nitrogen for 10 hours.

The BET specific surface area and elemental analysis results of the catalyst (c3) are listed in Table 1.

Further, the same operation as in Example 1 was carried out, except that the catalyst (1) was changed to the catalyst (c3), to obtain a fuel cell electrode (c3), and the oxygen reducing ability thereof was evaluated. The result is listed in Table 1.

Comparative Example 4

In a container, 3 g of zirconium hydroxide (Tosoh Corporation, TZ-0, BET value: 13 m$^2$/g) and 1.5 g of commercially available polyvinyl alcohol (POVAL 117, manufactured by Kuraray Co., Ltd.) were dissolved in 4 g of water, followed by introducing these components with the container into a hot air circulation dryer set at 60° C. to remove the water. 1.2 g of a portion of the resultant material was put in an alumina boat, the temperature of the portion was increased from room temperature (about 25° C.) to 800° C. at a temperature-raising rate of 150° C./h while circulating nitrogen at a flow rate of 200 ml/min, and the same temperature was maintained for 3 hours to obtain a catalyst (c4).

The BET specific surface area and elemental analysis results of the catalyst (c4) are listed in Table 1.

Further, the same operation as in Example 1 was carried out, except that the catalyst (1) was changed to the catalyst (c4), to obtain a fuel cell electrode (c4), and the oxygen reducing ability thereof was evaluated. The result is listed in Table 1.

Comparative Example 5

<Titanium Sulfate-Glycine-Iron>

The same operation as in Example 5 was carried out, except that the heat treatment temperature was changed to 400° C., to obtain a catalyst (c5).

The BET specific surface area and elemental analysis results of the catalyst (c5) are listed in Table 1.

Further, the same operation as in Example 1 was carried out, except that the catalyst (1) was changed to the catalyst (c5), to obtain a fuel cell electrode (c5), and the oxygen reducing ability thereof was evaluated. The result is listed in Table 1.

Comparative Example 6

<Titanium Sulfate-Glycine-Iron>
The same operation as in Example 6 was carried out, except that the heat treatment temperature was changed to 1300° C., to obtain a catalyst (c6).
The BET specific surface area and elemental analysis results of the catalyst (c6) are listed in Table 1.
Further, the same operation as in Example 1 was carried out, except that the catalyst (1) was changed to the catalyst (c6), to obtain a fuel cell electrode (c6), and the oxygen reducing ability thereof was evaluated. The result is listed in Table 1.

TABLE 1

| | | Proportion of the Number of Atoms | | | | | | | BET Specific Surface Area | Oxygen Reduction Current Density |
| --- | --- | --- | --- | --- | --- | --- | --- | --- | --- | --- |
| | | Ti | Zr | Nb | Fe | C | N | O | $m^2/g$ | $mA/cm^2$ @ 0.7 V |
| Example 1 | Catalyst (1) | 1 | | | | 1.02 | 0.13 | 0.88 | 273 | 0.16 |
| Example 2 | Catalyst (2) | 1 | | | | 1.60 | 0.20 | 0.61 | 165 | 0.31 |
| Example 3 | Catalyst (3) | 1 | | | | 1.24 | 0.15 | 1.05 | 277 | 0.32 |
| Example 4 | Catalyst (4) | 1 | | | | 2.10 | 0.05 | 1.46 | 311 | 0.73 |
| Example 5 | Catalyst (5) | 0.97 | | | 0.03 | 1.97 | 0.07 | 1.13 | 296 | 1.03 |
| Example 6 | Catalyst (6) | 0.97 | | | 0.03 | 2.54 | 0.07 | 1.52 | 96 | 0.15 |
| Example 7 | Catalyst (7) | 0.97 | | | 0.03 | 1.85 | 0.06 | 1.24 | 280 | 0.33 |
| Example 8 | Catalyst (8) | 1 | | | | 1.40 | 0.13 | 0.43 | 223 | 0.25 |
| Example 9 | Catalyst (9) | 1 | | | | 0.71 | 0.04 | 0.89 | 243 | 0.12 |
| Example 10 | Catalyst (10) | | 0.96 | | 0.04 | 1.85 | 0.05 | 1.53 | 265 | 0.96 |
| Example 11 | Catalyst (11) | | | 0.97 | 0.03 | 2.06 | 0.06 | 1.96 | 268 | 0.89 |
| Comp. Ex. 1 | Catalyst (c1) | 1 | | | | 0.52 | 0.48 | 0.01 | 1.8 | 0.01 |
| Comp. Ex. 2 | Catalyst (c2) | 1 | | | | 1.01 | 0.09 | 1.70 | 275 | 0.02 |
| Comp. Ex. 3 | Catalyst (c3) | 1 | | | | 0.10 | 0.01 | 1.88 | 4.2 | 0.05 |
| Comp. Ex. 4 | Catalyst (c4) | | 1 | | | 0.57 | 0.06 | 1.87 | 21 | 0.033 |
| Comp. Ex. 5 | Catalyst (c5) | 0.97 | | | 0.03 | 3.66 | 0.08 | 1.78 | 23 | 0.02 |
| Comp. Ex. 6 | Catalyst (c6) | 0.97 | | | 0.03 | 1.78 | 0.05 | 1.15 | 266 | 0.07 |

The invention claimed is:

1. A method for producing a fuel cell electrode catalyst, comprising:
a step (I) of bringing an aqueous solution of a transition metal compound (1) into contact with ammonia and/or ammonia water to generate a precipitate (A) containing an atom of the transition metal,
a step (II) of adding the precipitate (A) to an organic compound (B) and a liquid medium (C), and mixing them to obtain a catalyst precursor, and
a step (IV) of subjecting the catalyst precursor to heat treatment at a temperature of 500 to 1200° C. to obtain an electrode catalyst;
a portion or the entirety of the transition metal compound (1) being a compound containing, as a transition metal element, at least one transition metal element M1 selected from elements of group 4 and group 5 of the periodic table; and
the organic compound (B) being at least one selected from sugars, amino sugars, glycosaminoglycans, polyvinyl alcohols, polyalkylene glycols, polyesters, nitrogen-containing polymer compounds, nitrile group-containing compounds, amino acids, ascorbic acid and stearic acid.

2. The method for producing a fuel cell electrode catalyst according to claim 1, further comprising a step (III) of removing the liquid medium (C) from the catalyst precursor before the step (IV).

3. The method for producing a fuel cell electrode catalyst according to claim 1, wherein the transition metal element M1 is at least one selected from titanium, zirconium, niobium, and tantalum.

4. The method for producing a fuel cell electrode catalyst according to claim 1, wherein the transition metal compound (1) is at least one selected from the group consisting of metal halides, metal sulfates, metal alkoxides, metal acetates, metal phosphates, metal nitrates, metal organic acid salts, metal acid halides, metal perhalates, metal hypohalites, and metal complexes.

5. The method for producing a fuel cell electrode catalyst according to claim 1, further comprising mixing a compound containing, as a transition metal element, at least one transition metal element M2 selected from iron, nickel, chromium, cobalt, and manganese, in the step (II).

6. A method for producing a fuel cell electrode catalyst layer, comprising a step of producing a fuel cell electrode catalyst by the method according to claim 1, and a step of forming a fuel cell electrode catalyst layer using a catalyst layer formation material comprising the fuel cell electrode catalyst.

7. A method for producing a fuel cell electrode comprising a fuel cell electrode catalyst layer and a porous support layer, the method comprising a step of producing a fuel cell electrode catalyst layer by the method according to claim 6, and a step of forming the fuel cell electrode catalyst layer on a surface of the porous support layer.

8. A method for producing a membrane electrode assembly comprising a cathode, an anode, and an electrolyte membrane placed between the cathode and the anode, the method comprising a step of producing a fuel cell electrode by the method according to claim 7, and a step of placing the cathode, the electrolyte membrane, and the anode to produce a membrane electrode assembly while using the fuel cell electrode as at least one of the cathode and the anode.

9. A method for producing a fuel cell, comprising a step of producing a membrane electrode assembly by the method according to claim 8, and a step of producing a fuel cell using the membrane electrode assembly.

10. The method for producing a fuel cell according to claim 9, wherein the fuel cell is a polymer electrolyte fuel cell.

* * * * *